(12) United States Patent
Yu et al.

(10) Patent No.: US 8,630,584 B2
(45) Date of Patent: Jan. 14, 2014

(54) RF SIM CARD, CARD READER, AND COMMUNICATION METHOD

(75) Inventors: Yunbo Yu, Guangdong (CN); Aimin Shen, Guangdong (CN); Shan Zhu, Guangdong (CN); Li Ouyang, Guangdong (CN); Meixiang Li, Guangdong (CN); Weixi Luo, Guangdong (CN)

(73) Assignee: Nationz Technologies Inc., Nanshan District (CN)

( * ) Notice: Subject to any disclaimer, the term of this patent is extended or adjusted under 35 U.S.C. 154(b) by 341 days.

(21) Appl. No.: 13/011,125

(22) Filed: Jan. 21, 2011

(65) Prior Publication Data

US 2011/0165862 A1    Jul. 7, 2011

Related U.S. Application Data

(63) Continuation-in-part of application No. PCT/CN2009/074556, filed on Oct. 22, 2009, and a continuation-in-part of application No. PCT/CN2009/076349, filed on Dec. 31, 2009, and a continuation-in-part of application No. PCT/CN2010/071395, filed on Mar. 29, 2010.

(30) Foreign Application Priority Data

Nov. 26, 2008  (CN) .......................... 2008 1 0217967
Dec. 9, 2009   (CN) .......................... 2009 1 0250430
Jan. 29, 2010  (CN) .......................... 2010 1 0300975

(51) Int. Cl.
    *H04B 5/00*    (2006.01)
(52) U.S. Cl.
    USPC .......... 455/41.1; 455/41.2; 455/411; 340/5.8; 340/5.81

(58) Field of Classification Search
    USPC .......... 455/411, 41.1, 41.2, 63.4, 558, 562.1, 455/575.7, 60.1–90.3, 95, 129, 151.2; 340/825.31, 825.34, 825.69, 825.72, 340/5.81, 10.4, 10.52
    See application file for complete search history.

(56) References Cited

U.S. PATENT DOCUMENTS 6,838,989 B1 *  1/2005  Mays et al. ................. 340/572.1
7,006,047 B2 *  2/2006  Marsan et al. ................. 343/705

(Continued)

FOREIGN PATENT DOCUMENTS

CN    1643806 (A)    7/2005
CN    1877596 (A)    12/2006

(Continued)

OTHER PUBLICATIONS

International Search Report PCT/CN2009/076349 dated Sep. 23, 2010.

(Continued)

*Primary Examiner* — Kashif Siddiqui
*Assistant Examiner* — Marisol Fahnert
(74) *Attorney, Agent, or Firm* — Foley & Lardner LLP

(57) ABSTRACT

A radio frequency (RF) device includes an RF transceiver, an RF antenna, and a magnetic signal detector. The RF is selected to be in the very high frequency (VHF), ultrahigh frequency (UHF), or super high frequency (SHF) bands such that the shielding effect is reduced and the RF device can be configured as a SIM card disposed inside a cellular phone with an increased RF communication range. The magnetic signal detector is used to sense a magnetic field signal from an RF reader, which includes an RF transceiver, an RF antenna, and a magnetic signal transmitter. The longer communication range afforded by the VHF, UHF, or SHF bands is reduced by the sensing of the magnetic field, thereby providing a communication range control, while the RF device and the RF reader exchange information through the RF channel with improved security as a result of the range control.

81 Claims, 18 Drawing Sheets

(56) References Cited

U.S. PATENT DOCUMENTS

| | | | |
|---|---|---|---|
| 2002/0089448 A1* | 7/2002 | Poliak et al. | 342/385 |
| 2002/0153893 A1* | 10/2002 | Watkins et al. | 324/318 |
| 2004/0178274 A1* | 9/2004 | Wu et al. | 235/491 |
| 2005/0093374 A1* | 5/2005 | Connors et al. | 307/126 |
| 2006/0229053 A1* | 10/2006 | Sivard | 455/343.2 |
| 2007/0082703 A1* | 4/2007 | Van Kleef | 455/558 |
| 2007/0111746 A1* | 5/2007 | Anderson | 455/522 |
| 2008/0058029 A1* | 3/2008 | Sato et al. | 455/573 |
| 2008/0076475 A1 | 3/2008 | Kim | |
| 2008/0088415 A1* | 4/2008 | Quan | 340/10.3 |
| 2008/0311861 A1* | 12/2008 | Lepek | 455/73 |
| 2009/0261977 A1* | 10/2009 | Leone | 340/572.8 |

FOREIGN PATENT DOCUMENTS

| | | |
|---|---|---|
| CN | 101014968 (A) | 8/2007 |
| CN | 101295367 (A) | 10/2008 |
| CN | 101388124 (A) | 3/2009 |
| GB | 2 310 067 A | 8/1997 |
| WO | WO 2008/009830 A2 | 1/2008 |
| WO | WO 2008/128965 A1 | 10/2008 |

OTHER PUBLICATIONS

International Search Report PCT/CN2010/071395 dated May 27, 2010.

International Search Report PCT/CN2009/074556 dated Feb. 4, 2010.

CN 201134107 (Y), Yaneng Yang et al., Oct. 15, 2008, Radio Frequency Recognition Network Antenna, *Abstract.

CN 201172588(Y)—Dec. 31, 2008, Zhenwei HE et al., RFID Read/Write Device for Container Lifting Device, *Abstract.

Communication (Supp EP Search Report) in EP Appl No. 09828587.7 dated May 30, 2012.

* cited by examiner

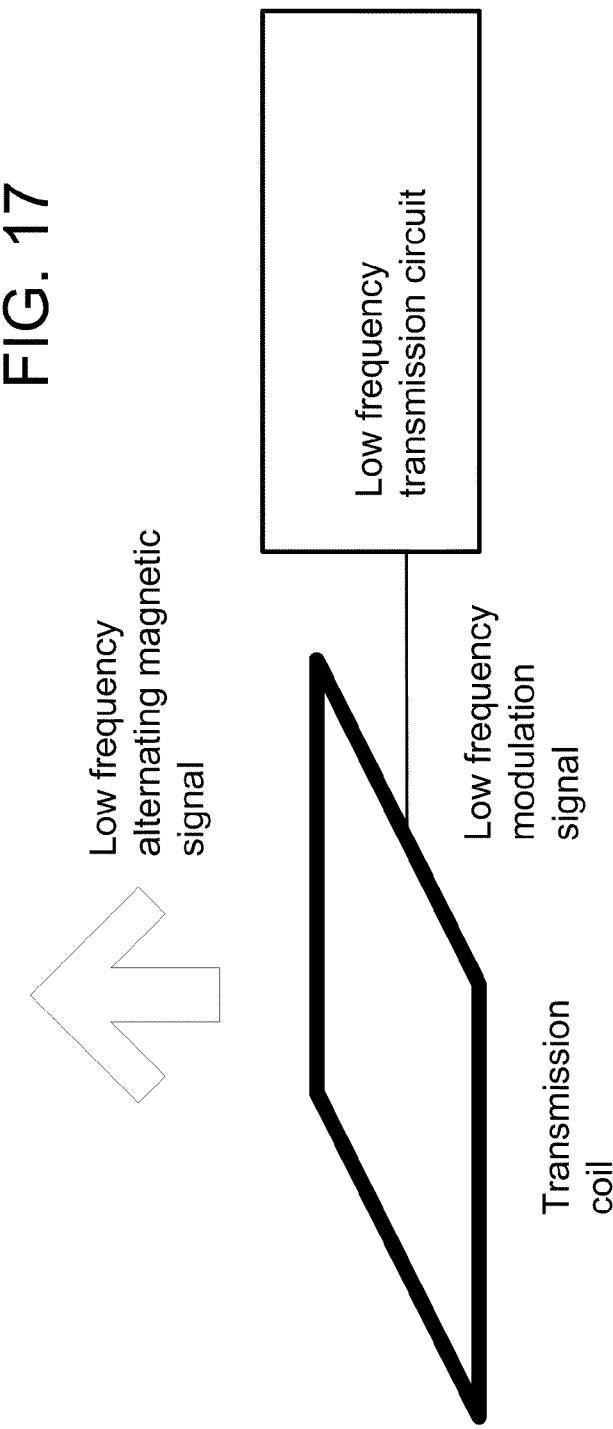

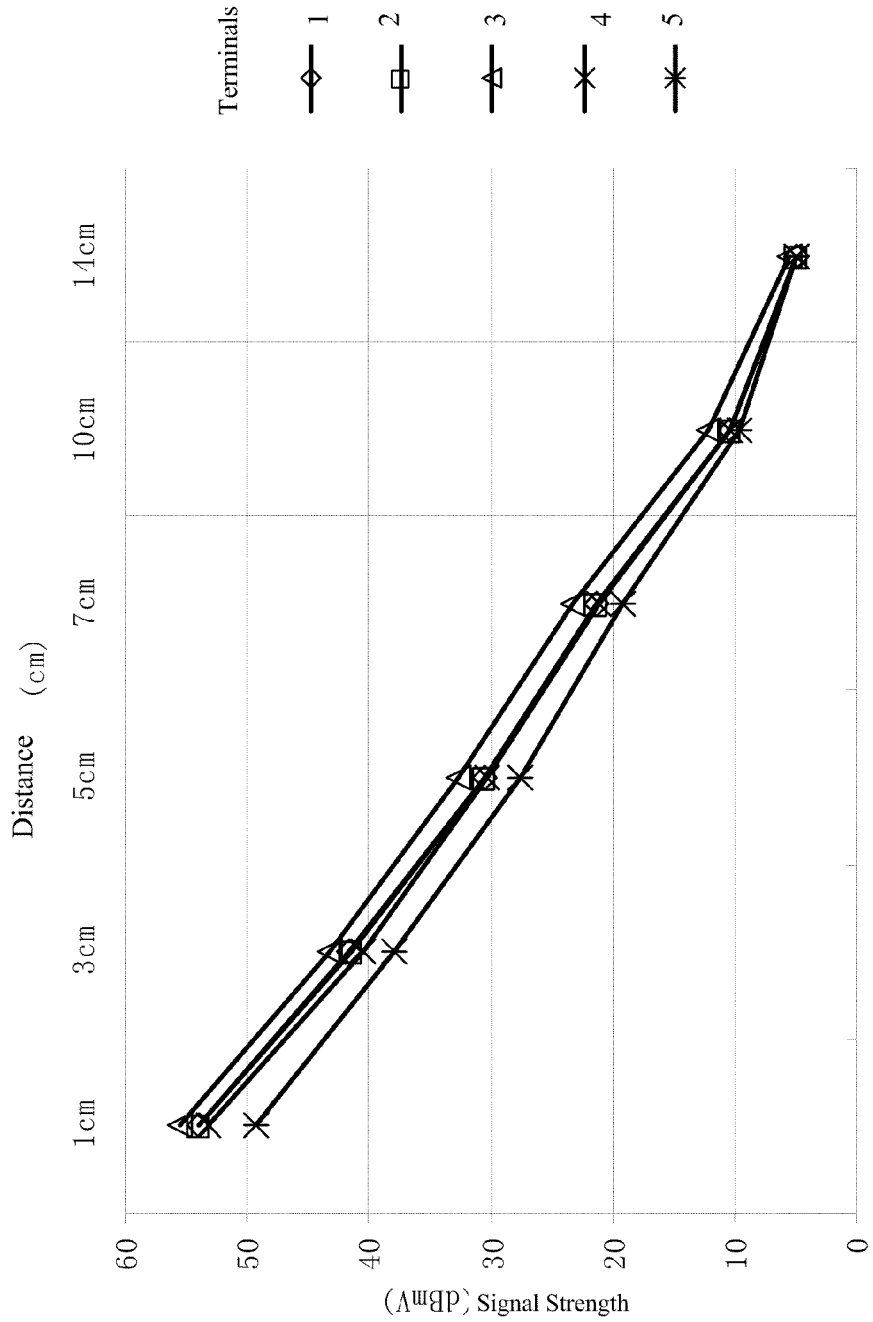

RF SIM CARD, CARD READER, AND COMMUNICATION METHOD

CROSS-REFERENCE TO RELATED PATENT APPLICATIONS

This application is a continuation-in-part of: PCT/CN2009/074556 filed Oct. 22, 2009, which claims priority to Chinese Patent Application No. 200810217967.X filed Nov. 26, 2008; PCT/CN2009/076349 filed Dec. 31, 2009, which claim priority to Chinese Patent Application No. 200910250430.8 filed Dec. 9, 2009; and PCT/CN2010/071395 filed Mar. 29, 2010, which claims priority to Chinese Patent Application No. 201010300975.8 filed Jan. 29, 2010. The respective disclosures of the foregoing applications are incorporated herein by reference in their entirety.

TECHNICAL FIELD

The present invention involves radio frequency (RF) wireless communication technologies, particularly RF card, RF card reader and RF communication control methods.

BACKGROUND

The subscriber identity module (SIM) is widely used in mobile communications. Such a module is used in a mobile communication terminal in the form of a SIM card.

Mobile terminals can be used not only for long-range communications but also for short-range transactions, such as electronic payment. They can serve as a smart card, a credit card, or an access control device.

Different mobile terminals, due to differences in their internal structures and materials used to build these terminals, have a very large variance in their effectiveness of transmitting RF signals. Those mobile terminals that are relatively "transparent" to RF can have an RF communication range of several meters. Those mobile terminals that are less "transparent" to RF may have an RF communication range of only a few centimeters.

In electronic payment applications, such as when using a smart card for public transit fare payment, it is generally required that the transaction range is controlled, such as within 10 cm, to avoid transactions being made to other cards near the card reader without users' knowledge or authorization. Meanwhile, the communication within the transaction range needs to be reliable and fast.

To avoid the large differences in the RF signal attenuations caused by the different mobile terminals, it may be necessary to calibrate the mobile terminals. That is, before adding or using RF functionalities, the attenuation parameters of the mobile terminals must be recorded.

Another mobile payment technology, near-field communication (NFC), is evolved from contactless technologies based on ISO 14443 standards, which adopt a 13.56 MHz magnetic field to transmit both signals and energy. To use this technology, it is necessary to adopt specifically designed mobile terminals or to significantly modify existing mobile terminals.

At the frequency of 13.56 MHz, the card reader and the card utilize the coupling of electrical conduction coils to exchange signals and transmit energy. The card reader is required to simultaneously transmit energy and 13.56 MHz amplitude-modulation signals, and thus there is a stringent requirement for the size and area of the reception coil in the card. In the direction from the card to the card reader, the card relies on short-circuit and open-circuit in-card coil load modulation method, not relying on an external power source, to directly transmit information to the card reader through the transmission field. Due to that the load modulation signal requires better coupling coefficient between the coil in the card and the coil in the card reader, these technologies further have more requirements of the size and area of the on-card antenna. In addition, because of the relatively low frequency of 13.56 MHz, the coupling coil has a relatively large size.

The antenna coil in NFC technologies, by virtue of its large size, cannot be fitted into a SIM card, an SD/TF card, or other cards used for mobile terminals. Furthermore, the metal and other conductive objects in a mobile terminal can interfere seriously with the effectiveness of reception and load modulation. To achieve good communication, therefore, it is necessary to modify a mobile terminal, such as a cellular phone, in a specific manner to optimize the effect of the antenna. Illustrative of such modifications include is the placement of the multi-turn antenna on the back cover of the mobile terminal battery pack and the use of a flexible connection to lead the antenna from the terminal motherboard to the backside of the battery pack. The back cover of the cellular phone also cannot be a metal material.

Even if an NFC antenna can be disposed into a mobile terminal, the signals at 13.56 MHz frequency can form strong eddy currents when encountering metal and other conductive objects. As a result, the signal strength changes following the different structures of the mobile terminals, resulting in a large variations in the field strength on the reception antenna of the NFC card, making it necessary to calibrate for the different mobile terminals.

Due to the above factors, NFC requires the antenna coil in the mobile terminal to be sufficiently large. Such antenna coils cannot fit into the SIM cards, SD/TF cards or other cards used for the mobile terminals. Furthermore, the metal and other conductive objects in a mobile terminal can seriously interfere with the effectiveness of the reception and load modulation. Thus, to achieve a good communication, it is necessary to modify the mobile terminals such as cellular phones in specific manners, to optimize the effect of the antennas. The modifications include, for example, placing the multi-turn antenna on the back cover of the mobile terminal battery pack, or using a flexible connection to lead the antenna from the terminal motherboard to the backside of the battery pack. The back cover of the cellular phone cannot be a metal material.

In Japan, for example, electronic payments using cellular phones have been popular. However, due to the limitations of the ISO 14443 technologies, only specifically-designed cellular phones can be used.

Chinese Patent CN 200810142624.1 proposed a method for controlling an RF communication range for a mobile terminal. Various mobile terminals are tested to obtain their respective RF field distribution characteristics, which are pre-stored in these mobile terminals. An array of detectors is used to measure an RF field distribution adjacent a mobile terminal. The measured field distribution is compared with the pre-stored field distribution characteristics to derive a distance between the RF mobile terminal and an RF control terminal. The derived distance can then be compared with a predetermined range to determine whether the mobile terminal is within a specified communication range. This calibration process is relatively complex, and the RF signals may interfere with it.

SUMMARY OF THE INVENTION

The present inventors recognized the limitations resulting from the shielding effect in the conventional 13.56 MHz technology, and have provided an RF device design, including an RF transceiver, an RF antenna, and a magnetic signal detector, that addresses these limitations and attendant disadvantages. The RF for the inventive design is selected to be in the very high frequency (VHF), ultrahigh frequency (UHF), or super high frequency (SHF) bands, such that the shielding effect is reduced and the RF device can be configured as a SIM card disposed inside a cellular phone with an increased RF communication range.

The inventors further recognize that the increased communication range afforded by the VHF, UHF, or SHF bands may lead to a higher security risk and may require calibration of the communication range. The magnetic signal detector in the RF device is used to sense a magnetic field signal from an RF reader, which includes an RF transceiver, an RF antenna, and a magnetic signal transmitter. The longer communication range afforded by the VHF, UHF, or SHF bands is reduced by the sensing of the magnetic field, thereby providing a communication range control and calibration, while the RF device and the RF reader exchange information through the RF channel with improved security as a result of the range control.

In one aspect, an RF SIM card is provided including a SIM portion, a first transceiver module, a first RF antenna, and a magnetic induction module. The first transceiver module is configured to be in a dormant state if the magnetic induction module does not receive a magnetic field signal, and to be activated by an electrical signal converted from a magnetic field signal received by the magnetic induction module.

In one embodiment, the RF SIM card further includes a microcontroller. The first transceiver module is electrically connected to the first RF antenna and the first microcontroller, and the magnetic induction module is electrically connected to the first transceiver module.

The magnetic induction module can include one of an induction coil, a Hall device, or a magnetic induction switch.

In one embodiment, the first transceiver module has an adjustable activation threshold for activation by an electrical signal converted from a magnetic field signal. The activation threshold can be adjusted, for example, based on a predetermined communication range between the RF SIM card and an RF card reader.

In one embodiment, the RF SIM card has a communication range determined by an activation threshold of the first transceiver module.

The first transceiver module can include an RF transceiver module and is configured to function in a super high frequency (SHF), a very high frequency (VHF), or an ultra high frequency (UHF) range.

The RF SIM card can be configured as a replaceable SIM card of a mobile communication terminal. The RF SIM card has a communication range that does not depend substantially on the mobile communication terminal in which the RF SIM card is disposed.

The magnetic field signal can be a signal matching the RF SIM card.

The RF SIM card can further include a first microcontroller, wherein the first microcontroller is configured to be in a dormant state if the magnetic induction module does not receive a magnetic field signal, and wherein the first transceiver module is further configured to examine whether an RF signal exists to determine whether to interrupt or wake up the first microcontroller and to enter a working state, wherein in the working state the first transceiver module exchanges data with an RF card reader.

In another aspect, an RF card reader is provided to function with the RF SIM card. The RF card reader and the RF SIM card form a communication system. The RF card reader includes a second transceiver module, a second RF antenna, and a magnetic field generation module. The magnetic field generation module is configured to generate the magnetic field signal to active the first transceiver module if the RF SIM card and the RF card reader are within an effective communication range.

In one embodiment, the second transceiver module is configured to function in the SHF, VHF, or UHF range.

The first transceiver module can have an adjustable activation threshold for activation by the electrical signal converted from the magnetic field signal, and wherein the activation threshold is adjusted based a predetermined communication range between the RF SIM card and the RF card reader.

The communication range between the RF SIM card and the RF card reader is determined based on an activation threshold of the first transceiver module.

In another aspect, a communication method is provided including: if an RF SIM card and an RF card reader are not within an effective communication range, having a first transceiver module of the RF SIM card in a dormant state; and if the RF SIM card and the RF card reader are within the effective communication range, converting a magnetic field signal into an electrical signal to activate the first transceiver module, wherein the magnetic signal is generated by a magnetic field generation module of the RF card reader and received by a magnetic induction module of the RF SIM card.

In one embodiment, the method further includes determining whether to interrupt or wake up a first microcontroller in the RF SIM card based on whether an RF signal is detected, and if the RF signal is detected, waking up the first microcontroller, activating the first transceiver module to enter a working state to thereby exchange data with a second transceiver module in the RF card reader, and sending the exchanged data to respective microcontrollers of the RF SIM card and the RF card reader for processing.

The method can further include adjusting an activation threshold of the first transceiver module to thereby select an effective communication range between the RF SIM card and the RF card reader.

In one embodiment, the method further includes disposing the RF SIM card in a mobile communication terminal, wherein the effective communication range between the RF SIM card and the RF card reader does not depend substantially on the mobile communication terminal.

The first and second transceiver modules can be configured to function in the SHF, VHF, or UHF range.

In one aspect, a radio frequency (RF) apparatus is provided including an RF transceiver, an RF antenna, and a magnetic signal detector. A microcontroller can be included and configured to process the magnetic field signal. The magnetic signal detector can be a magnetic module, or comprise various components for generating the magnetic field signal, and is separate from the RF antenna. The RF transceiver can also be a module, or comprise various components.

In one embodiment, the magnetic detector comprises one of a coil, a Hall device, or a magnetic induction switch. The RF transceiver, RF antenna, magnetic detector, and microcontroller can be all integrated in an integrated circuit (IC) card. The magnetic detector can have a predetermined detection range. The magnetic detector can be a magnetic induction and receiver module.

In one embodiment, if said magnetic detector does not detect a magnetic field signal, said RF transceiver and microcontroller are in a dormant state, and wherein if said magnetic field signal is detected, said magnetic detector converts the detected magnetic field signal into an electrical signal, and said RF transceiver and microcontroller are activated. The magnetic detector can have a predetermined threshold value for comparison with the electrical signal to determine whether to activate the RF transceiver and microcontroller. The threshold value can be adjustable.

In one embodiment, the RF device is directly integrated onto an integrated circuit (IC) card, an SDIO card, an SD card, an MMC card, a motherboard, or an apparatus shell. The IC card can be a SIM card.

The microcontroller can be a processor of an IC card, an SDIO card, an SD card, a MMC card, or a motherboard. The RF device can be disposed in a mobile terminal or a fixed terminal. In some embodiments, the mobile terminal is a cellular phone, a personal digital assistant (PDA), or a laptop computer, and wherein said fixed terminal is a personal computer, an industrial control computer, an automatic teller machine (ATM), or an access control terminal.

In another aspect, an RF reader is provided including an RF transceiver, an RF antenna, a magnetic signal transmitter configured to generate a magnetic field and transmit a magnetic field signal, and a microcontroller configured to control the magnetic signal transmitter.

In one embodiment, the magnetic field is a non-alternating magnetic field. In another embodiment, the magnetic field is a low-frequency alternating magnetic field. The low-frequency alternating magnetic field can have a frequency of about 0.1 kHz-100 kHz. In some embodiments, the low-frequency alternating magnetic field has a frequency of about 1 kHz-30 kHz. In some examples, the low-frequency alternating magnetic field has a frequency of about 1 kHz, 2 kHz, 5 kHz, 10 kHz, 20 kHz, 30 kHz, or 50 kHz.

In one embodiment, the magnetic detector is configured to transmit a variable-amplitude magnetic field as instructed by said microcontroller. The magnetic field can have a distribution that has little or no variation, can have a predetermined effective transmission range, and can be configured to modulate instruction information onto said magnetic field signal. In one embodiment, the magnetic detector is configured to modulate instruction information onto said magnetic field signal through an on-off keying (OOK) or a time-modulation scheme.

In another aspect, a communication system is provided including an RF device, and an RF reader. The RF device and the RF reader are configured to have a communication range controlled through a magnetic field, and to exchange information through an RF channel.

In one embodiment, the RF device and the RF reader are further configured for identification through the magnetic field signal. The RF device and the RF reader are further configured for identification through both the magnetic field signal and the RF channel.

In another aspect, a communication method is provided including controlling a communication range between two apparatuses using a magnetic field, and exchanging information between the two apparatuses through a radio frequency (RF) communication.

In one embodiment, the method further includes authenticating at least one of the two apparatuses through the magnetic field. In another embodiment, the method further includes authenticating at least one of the two apparatuses through both the magnetic field and the RF communication.

The two apparatuses can include an RF device comprising a magnetic detector configured to detect a magnetic field signal, and an RF reader comprising a magnetic signal transmitter, and the communication method can further include: said magnetic signal transmitter modulating predetermined instruction information onto said magnetic field signal, and transmitting said magnetic field signal; said magnetic detector decoding said instruction information after receiving said magnetic field signal; said RF device, based on said decoded instruction information, sending corresponding RF information to said RF reader through an RF channel; said RF reader performing an identification based on said RF information; and exchanging information between said RF device and RF reader if said identification passes.

In one embodiment, the magnetic field is a non-alternating magnetic field. In another embodiment, the magnetic field is a low-frequency alternating magnetic field. The low-frequency alternating magnetic field can a frequency of about 0.1 kHz-100 kHz, such as 1 kHz-30 kHz, for example about 1 kHz, 2 kHz, 5 kHz, 10 kHz, 20 kHz, 30 kHz, or 50 kHz.

The magnetic signal transmitter can transmit an amplitude-variable magnetic field based on the preset instruction information, and can have a distribution that has little or no variation. In one embodiment, the modulating comprises an on-off keying (OOK) or a time modulation scheme.

In one embodiment, the RF device is configured to send the decoded instruction information directly to said RF reader through the RF channel, and wherein said identification passes only if the instruction information received by the RF reader match the preset instruction information. The magnetic signal transmitter can have a predetermined effective transmission range. The magnetic detector can have a predetermined effective detection range.

In one embodiment, if the magnetic detector does not detect a magnetic field, other portions or modules of said RF device are in a dormant state; if the magnetic detector detects a magnetic field, it converts the detected magnetic field into an electrical signal and activates the other modules or portions of the RF device. The magnetic detector has a predetermined threshold value for comparing with the converted electrical signal, to determine whether to activate the other modules or portions of the RF device. The threshold value can be adjustable.

Pursuant to another aspect of the invention, a communication method is provided that entails determining whether a radio frequency (RF) apparatus is in a predetermined effective communication range of an RF reader, based on a low-frequency alternating magnetic field signal that is transmitted by the RF reader, is detected by the RF device, and includes identification information of the RF reader. The inventive method further includes authenticating at least one of the RF device or the RF reader and then performing a transaction between the RF reader and the RF device through an RF channel.

The above-mentioned determining step can include converting the low-frequency alternating magnetic field signal into an electrical signal and then comparing the electrical signal with a predetermined threshold value. The predetermined threshold value is substantially the same for different mobile terminals having the RF device disposed therein.

The authenticating step can include sending identification information of the RF device and identification information of the RF reader, received by the RF device, from the RF device to the RF reader; and then comparing the identification information of the RF reader received by the RF reader with identification information stored at the RF reader. A transaction is conducted only if such comparing yields a matching result. The method can include as well the forming of a combination address, employing for that purpose the identification information of the RF reader and the identification information of the RF device, where the transaction is performed using the combination address.

In some embodiments of the invention, the low-frequency alternating magnetic field has a frequency selected such that at or below the frequency, no calibration is required for different mobile terminals having the RF device installed therein. The frequency can be below a system highest working frequency f0, below which no calibration is required for the different mobile terminals. The value of f0 can ascertained by a process that includes (i) determining a system range control target (Din, Dv), where Din represents an effective communication range between a terminal in which the RF device is disposed and the RF reader and Dv represents a range of distance variation, where within a distance of 0–Din the transaction is guaranteed, within a distance between Din and Din+Dv the transaction can still be performed, and beyond a distance of Din+Dv the transaction is not allowed. The process further includes: (ii) determining a detection signal variation range $\delta_R$ at the RF device caused by the RF reader; (iii) determining a detection signal variation range $\delta_C$ at the RF device caused by the RF device itself; (iv) measuring signal-distance curves for various typical types of terminals and obstacles under a testing frequency f; (v) determining a detection signal variation range $\delta_A$ at the RF device, based on the system range control target (Din, Dv), where $\delta_A$ equals a signal difference between a first signal value and a second signal value, where the first signal value corresponds to Din in a signal value-distance curve having an average field attenuation curve slope obtained from the signal value-distance curves for various typical types of terminals and obstacles, and where the second signal value corresponds to (Din+Dv); (vi) determining a detection signal variation range $\delta_T$ at the RF device, resulting from attenuation characteristics of the terminal, where $\delta_T=\delta_A-\delta_R-\delta_C$; and (vii) calculating a largest field strength variation $\delta$ at a plurality of locations for various typical terminals and obstacles and, if $\delta>\delta_T$, then reducing the testing frequency f, and repeating the measuring step (iv), but if $\delta=\delta_T$, then the present testing frequency f equals f0.

In accordance with the invention, the low-frequency alternating magnetic field can be transmitted according to predetermined transmission parameters, including but not limited to the frequency, a modulation scheme, an encoding scheme, and a transmission magnetic field strength amplitude Br. The modulation scheme, encoding scheme, and Br preferably are selected such that Vr/Vn>SNR, where: Vr is a detected signal at the RF device under a condition that the RF reader transmits the low-frequency alternating magnetic field signal with the selected modulation scheme and encoding scheme; Vn is a noise level at the RF device under a condition that the RF reader does not transmit the low-frequency alternating magnetic field signal; and SNR is a predetermined signal-to-noise ratio of the RF device. In one embodiment, the encoding scheme does not introduce an average DC component. The carrier modulation scheme does not introduce an amplitude variation or a carrier modulation scheme variation. In some embodiments, the encoding scheme comprises one of a Manchester encoding, a differential Manchester encoding, and a return-to-zero encoding, and wherein said modulation scheme comprises one of an on-off keying (OOK), a phase-shift keying (PSK), and a frequency-shift keying (FSK).

The methodology of the invention also can include determining a signal threshold value Vt for determining whether the RF device is in the predetermined effective communication range of the RF reader. In this regard Vt is determined by: measuring signal-distance curves for various typical terminals and obstacles; obtaining a base signal-distance curve, which is a median of the signal-distance curves for the various typical terminals and obstacles and has a distance to an upper limit and a lower limit of $\delta_T/2$; and selecting a signal value corresponding to (Din+Dv/2) on the base signal-distance curve as Vt. In another embodiment, the method includes determining a signal threshold value Vt for determining whether the RF device and the RF reader are in the predetermined effective communication range, wherein Vt is determined by: measuring signal-distance curves for various typical terminals and obstacles; obtaining a base signal-distance curve, which is a median or average of the signal-distance curves for the various typical terminals and obstacles; and selecting a signal value corresponding to (V5+V6)/2 on the base signal-distance curve as Vt, wherein V5 is a voltage on the base signal-distance curve corresponding to Vin, and V6 is a voltage on the base signal-distance curve corresponding to Din+Dv.

The low-frequency alternating magnetic field signal can have a frequency in an ultralow frequency range of 300 Hz-3 kHz, a very low frequency range of 3 kHz-30 kHz, or a low frequency range of 30 kHz-300 kHz. In some embodiments, the frequency is in a range of about 300 Hz-50 kHz. For example, the frequency can be about 500 Hz, 1 kHz, 1.5 kHz, 2 kHz, 2.5 kHz, 3 kHz, 4 kHz, 5 kHz, 10 kHz, 20 kHz, or 30 kHz.

Pursuant to another aspect of the invention, a communication system is provided that comprises (A) an RF reader configured to transmit a low-frequency alternating magnetic field signal, which includes identification information of the RF reader, and (B) an RF device. At least one of the RF reader and the RF device is configured to determine whether the RF device and the RF reader are in a predetermined effective communication range based on the low-frequency alternating magnetic field signal detected by the RF device. Also, at least one of the RF reader and the RF device is further configured to authenticate the other of the RF reader or the RF device through at least one of the low-frequency alternating magnetic field signal or an RF channel, and the RF reader and the RF device are configured to perform a transaction therebetween through the RF channel.

In accordance with the invention, the RF device can be configured to determine whether the RF device and the RF reader are in the predetermined effective communication range by comparing an electrical signal converted from the detected low-frequency alternating magnetic field signal with a threshold. The electrical signal can be one of a voltage signal or a current signal.

In some embodiments, the RF device is further configured to obtain the identification information of the RF reader from the low-frequency alternating magnetic field signal. The RF device can further send the obtained identification information of the RF reader and identification information of the RF device to the RF reader through the RF channel.

In this context, the RF reader can include at least one low-frequency transmission coil, at least one drive circuit, at least one encoding circuit, at least one first main processor, at least one RF transceiver circuit, and at least one RF antenna. The low-frequency transmission coil, drive circuit, encoding circuit, first main processor, RF transceiver circuit, and RF antenna can be connected in series. The system also can include a modulation circuit disposed between the drive circuit and the encoding circuit.

In one embodiment, the low-frequency transmission coil is an enameled wire coil or a printed circuit board (PCB) coil. The low-frequency transmission coil can have more than 10 turns, such as 50-500 turns. The coil can have a Ferrite core or an iron core.

The RF device can include a magnetic induction coil, and the low-frequency transmission coil of the RF reader can have a cross-sectional area larger than a cross-sectional area of the magnetic induction coil. The transmission coil may have a circular cross-section with a diameter of 3 cm, for instance, or it may have a 3 cm×3 cm square shape.

In one embodiment, the RF device includes at least one low-frequency magnetic induction circuit, at least one low-frequency amplification circuit, at least one threshold judgment and demodulation circuit, at least one second main processor, at least one RF transceiver circuit, and at least one RF antenna. The low-frequency magnetic induction circuit, low-frequency amplification circuit, threshold judgment and demodulation circuit, second main processor, RF transceiver circuit, and RF antenna can be connected in series. The low-frequency magnetic induction circuit can include a printed circuit board (PCB) coil, an enameled wire coil, a Hall device, or a giant magnetoresistance (GMR) device.

In some embodiments of the invention, the RF device is disposed in a terminal. The terminal can be a mobile terminal that includes one of a cellular phone, a personal digital assistant (PDA), and a laptop computer.

The RF device can be or can be disposed in a SIM card, a UIM card, a USIM card, a TF card, or an SD card.

In one embodiment, the identification information includes an identification code.

In another aspect of the invention, an RF device is provided that includes a first module configured to receive a magnetic field signal from an RF reader, where the magnetic field signal includes identification information of the RF reader and where the first module is further configured to determine, based on the magnetic field signal, whether the RF device is in an effective communication range of the RF reader. The RF device also includes a second module configured to send authentication information to the RF reader and to conduct a transaction with the RF reader through an RF channel.

BRIEF DESCRIPTION OF THE DRAWINGS

FIG. 17 is a schematic diagram of a low-frequency transmission portion of the RF reader.

FIG. 18 illustrates the frame format of the low-frequency data of the RF reader.

FIG. 19 illustrates voltage-distance curves measured for various terminals that receive a 1 kHz magnetic field.

DETAILED DESCRIPTION OF THE PREFERRED EMBODIMENTS

Figure 1:
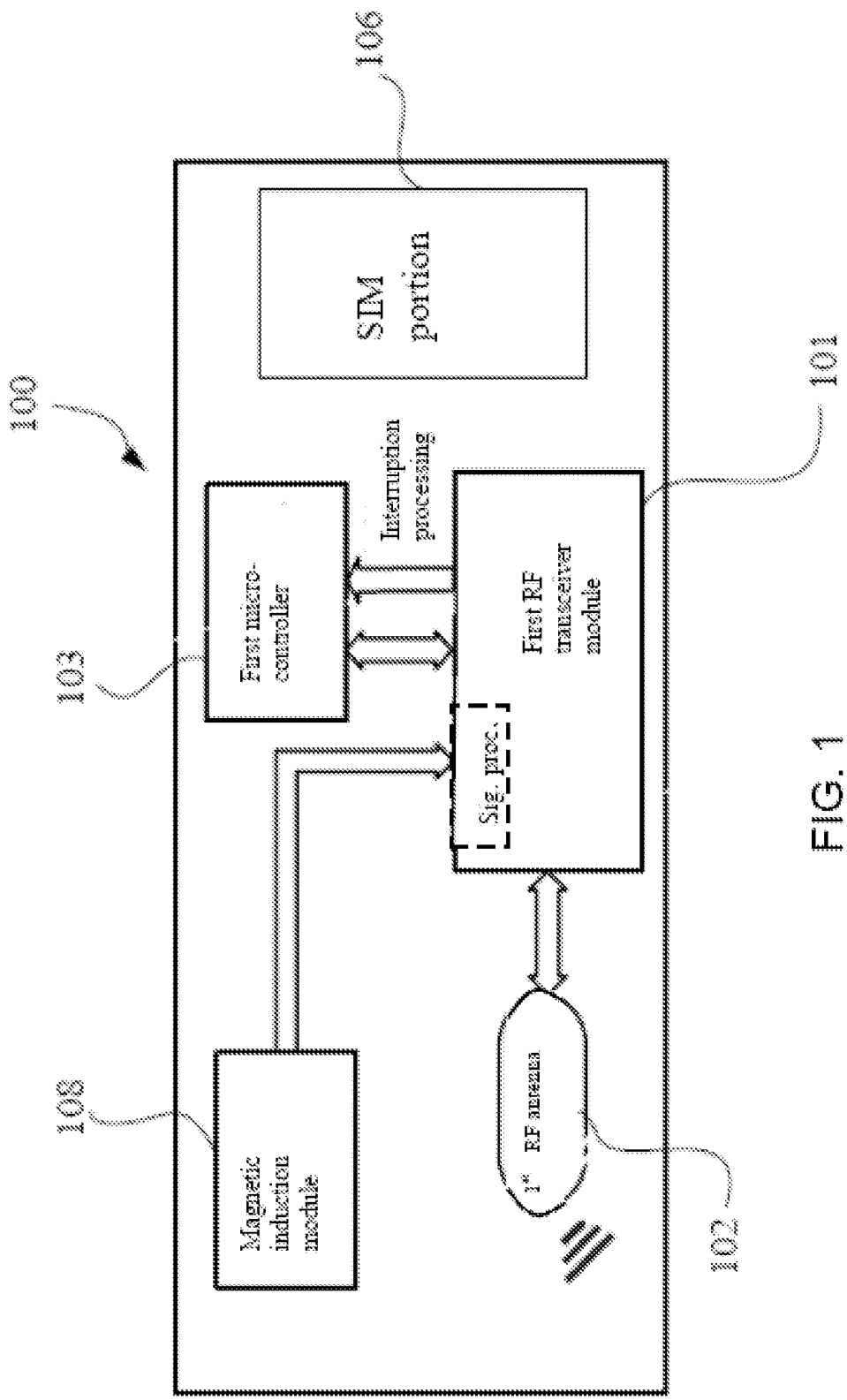
FIG. 1 is the logic block diagram illustrating an RF SIM card in accordance with one embodiment of the invention.

Various integrated circuit modules can be added to SIM cards. In addition to the basic SIM function of subscriber identification, these SIM cards also can have other useful functions. Chinese Patent Application No. 200710124354.7 (now Chinese Patent no. ZL 200710124354.7) and U.S. patent application Ser. No. 12/837,849 (filed Jul. 16, 2010), jointly owned by the present assignee, disclose an RF SIM card that adopts active RF technologies, allowing common SIM cards to have functionalities of, for example, mobile payment, electronic wallets, access control, and other consumer applications. These documents are hereby incorporated by reference in their entirety.

An RF SIM card draws electricity from the battery of the mobile terminal, and thus will affect the standby time of the mobile terminal. A method to reduce the RF SIM card power consumption includes: the RF SIM card determines whether there is a need to proceed to exchange processing by periodically querying on whether RF exchange data exist. This method reduces the power consumption of the RF SIM card to some extent. However, the RF transceiver module and the microcontroller of the RF SIM card are still in an activated state due to interrogations when there are in fact no RF exchange data. Thus, the RF SIM card still consumes power of the battery of the mobile terminal, and affects the standby time of the mobile terminal.

In applications such as using the RF SIM card as a public transit fare IC card, to avoid unintentional reading and erroneous reading of the card, the effective communication range between the RF SIM card and the RF card reader must be controlled to within a very small range. Both the RF SIM card and the card reader can affect the effective communication range. Existing technologies utilize the decay of the RF SIM card signal strength to control the wireless communication range between the RF SIM card and the RF card reader. However, RF SIM cards typically are assembled inside mobile communication terminals, and are affected by the shielding effect of the mobile communication terminals. For RF SIM cards with the same wireless transceiving power, the RF signals would have different powers after penetrating through different types of mobile communication terminals due to different shielding capabilities of these terminals. Thus, to control their respective wireless communication ranges to within an appropriate and substantially uniform range, RF SIM cards may need to be built with different wireless transceiving powers for different types of mobile communication terminals. This subsequently requires that, before using the RF SIM cards, the users must calibrate the wireless transceiving power of the RF SIM cards according to the types of the mobile communication terminals in which the RF SIM cards are installed. In addition, if a user replaces the mobile communication terminal, it may be necessary to recalibrate the RF SIM card to adjust the wireless transceiving power. This tedious calibration process not only makes the user feel inconvenient, but also hinders applications of the RF SIM cards.

Embodiments of the present invention therefore provide an RF SIM card and a suitable RF card reader, as well as a magnetic induction control method for RF communication, that diminish the need for the calibration process, that effectively reduce power consumption, and that have little effect on the standby time of the mobile communication terminal.

An RF SIM card in accordance with one embodiment of the invention includes a SIM portion, a first RF transceiver module, a first RF antenna, and a first microcontroller. The first RF transceiver module is in electrical connection with the first RF antenna and the first microcontroller. A magnetic induction module is also included, and is electrically connected to the first RF transceiver module. When the magnetic induction module of the RF SIM card does not receive a matching magnetic field signal, the first RF transceiver module and the first microcontroller of the RF SIM card are both in a dormant state. In some embodiments, the matching magnetic field signal is configured to transmit identification information, for example, that of the RF card reader. If the magnetic field signal correctly identifies the RF card reader, then it is considered a "matching" signal. When the magnetic induction module receives a magnetic field signal generated by the magnetic field generation module of an RF card reader, the received magnetic field signal is converted to an electrical signal to activate the first RF transceiver module. The first RF transceiver module subsequently examines whether an RF carrier signal exists to determine whether to generate an external interruption to wake up the first microcontroller, and further enters a normal working state to exchange data with the RF card reader.

The RF card reader working with the RF SIM card includes a second RF transceiver module, a second RF antenna, and a second microcontroller. The second RF transceiver module is electrically connected to the second RF antenna and the second microcontroller. A magnetic field generation module is also included, and is used for generating a magnetic field. If the RF SIM card approaches the RF card reader, the RF SIM card senses the magnetic field signal generated by the magnetic field generation module, the first RF transceiver module of the RF SIM card is activated and the first microcontroller is waken up.

A magnetic induction control method for RF communication is provided, including the following steps: A. providing a magnetic field generation module in the RF card reader; B. providing a magnetic induction module in the RF SIM card, said magnetic induction module is electrically connected to the first transceiver module of the RF SIM card; C. if the RF SIM card is not adjacent to the RF card reader, the first RF transceiver module and the first microcontroller of the RF SIM card are both in a dormant state; D. when the RF SIM card approaches the RF card reader, the magnetic induction module of the RF SIM card senses the magnetic field signal from the magnetic field generation module of the RF card reader, and the sensed magnetic field signal is converted to an electrical signal to activate the first RF transceiver module; E. the first RF transceiver module subsequently examines whether an RF carrier signal exists to determine whether to generate an external interruption to wake up the first microcontroller, and further enters a working state to exchange data with the second transceiver module of the RF card reader, and the first and second transceiver modules send the exchanged data to their respectively corresponding first and second microcontrollers.

The magnetic induction module can be an induction coil, a Hall device, or a magnetic induction switch.

The first RF transceiver module of the SIM card, which is activated by the electrical signal converted from the magnetic induction, has a threshold value that can be adjustable.

The first RF transceiver module of the RF SIM card and the second RF transceiver module of the RF card reader are configured to function in the super high frequency (SHF), very high frequency (VHF), or ultra high frequency (UHF) range.

Compared with conventional technologies, the RF SIM card, the RF card Reader, and the magnetic induction control methods in RF Communication of the disclosed embodiments have advantages in: 1. Disposing a magnetic induction module in the RF SIM card, disposing suitable magnetic field generation module in the RF card reader, and making the first RF transceiver module and the first microcontroller of the RF SIM card in a dormant state as the general state when they do not sense the matching magnetic field signal and/or if there are no RF exchange data; if the first RF transceiver module senses the appropriate magnetic field signal, e.g., if the RF SIM card approaches the RF card reader to perform card swiping for RF data exchanging, the first RF transceiver module and the first microcontroller enter the working mode. This way the power consumption of the RF SIM card is effectively reduced, and thus there is little effect on the standby time of the mobile terminal. 2. The embodiments disclosed herein use magnetic induction technologies to efficiently trigger the RF transceiver module to start working The transmission and induction of the magnetic field energy have little correlations with the design and structures of the mobile communication terminals. Thus, the RF SIM card senses consistent induction signal strength in different mobile communication terminals. 3. After the first transceiver module of the RF SIM card is activated, it examines whether an RF carrier signal exists and then decides to generate an external interruption or wake up the first microcontroller, further effectively reduces the power consumption of the RF SIM card. The activation threshold value of the first RF transceiver module of the RF SIM card can be adjustable, thereby effectively controlling the card reading range to within a specified range, and avoiding erroneous and unintentional readings.

An RF SIM card 100, as illustrated in FIG. 1, includes SIM portion 106, a first RF transceiver module 101, a first RF antenna 102, and a first microcontroller 103. The SIM portion 106 can have the functions of a conventional SIM card, e.g., identifying the subscriber. The first RF transceiver 101 is electrically connected respectively to the first RF antenna 102 and the first microcontroller 103. A magnetic induction module 108 is also included, and is electrically connected to the first RF transceiver module 101.

The magnetic induction module 108 can include an induction coil, a Hall device, or a magnetic induction switch, or other magnetic elements known in the art.

Figure 2:
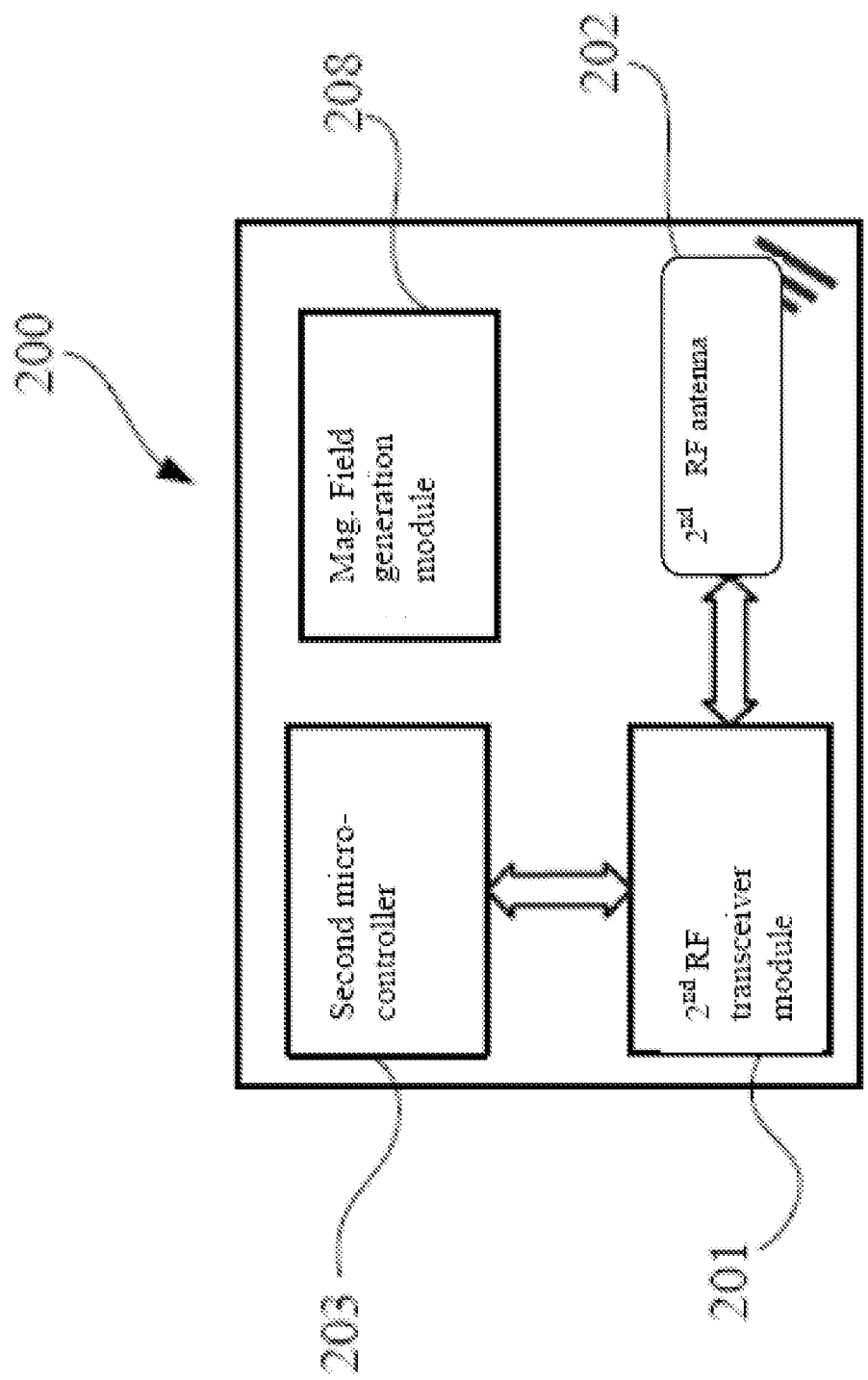
FIG. 2 is the logic block diagram illustrating an RF card reader in accordance with one embodiment of the invention.

An RF card reader 200, as illustrated in FIG. 2, includes a second RF transceiver module 202, a second RF antenna 202, and a second microcontroller 203. The RF card reader 200 is configured to function with the RF SIM cards 100, and the RF card reader 200 and matching or suitable RF SIM cards 100 function as a system. The second RF transceiver 202 is electrically connected to the second RF antenna 202 and the second microcontroller 203 respectively. Also included is a magnetic field generation module 208 used for generating a magnetic field.

When the RF SIM card 100 approaches said RF card reader 200, the magnetic induction module 108 senses the appropriate magnetic field signal generated by the magnetic field generation module 208. The magnetic field signal is converted and processed into an electrical signal and is then sent to the first RF transceiver module 101, activating the first RF transceiver module 101. The first RF transceiver module 101 further examines whether an RF carrier signal exists to determine whether to generate an external interruption to wake up the first microcontroller 103, and then enters a normal working state to exchange RF data with the RF card reader 200.

Figure 3:
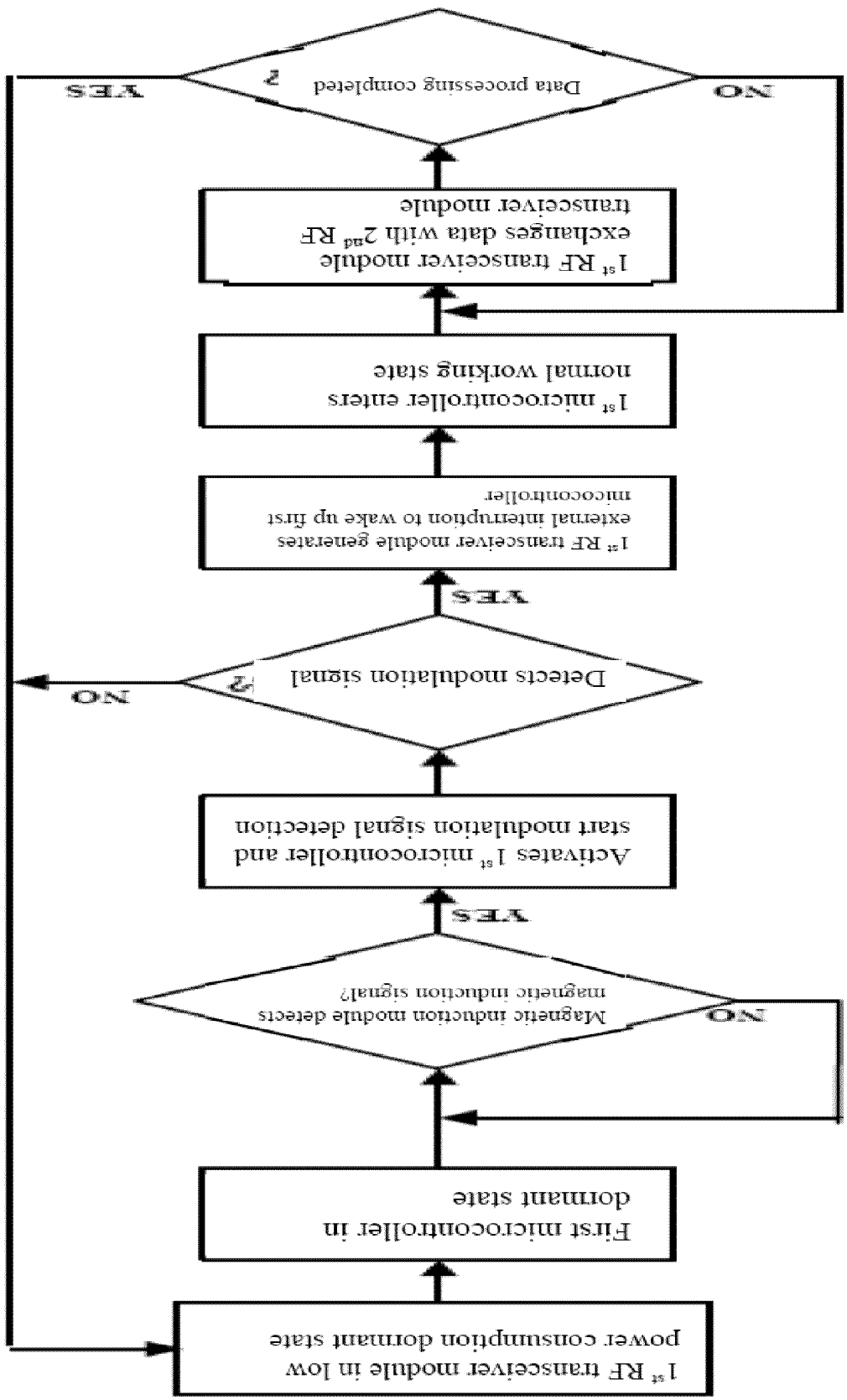
FIG. 3 is the logic flowchart illustrating a magnetic induction control method for the RF communication in accordance with one embodiment of the invention.

With reference to FIG. 3, it is described in a simplified form the RF communication process between the RF SIM card 100 functioning as a smart RF card and the RF card reader 200.

Step 1: in a general state, i.e., when the RF SIM card 100 is not adjacent to the RF card reader 200, the first RF transceiver module 101 of the RF SIM card and the first microcontroller 103 are in a dormant state;

Step 2: when the RF SIM card 100 approaches the RF card reader 200, the RF SIM card 100 enters the magnetic field generated by the magnetic generation module 208 of the RF card reader 100, and the magnetic induction module 108 of the RF SIM card 100 senses the magnetic field signal generated by the magnetic field generation module 208;

Step 3: the sensed magnetic field signal is converted and processed into an electrical signal to activate and start the first RF transceiver module 101. The first RF transceiver module 101 uses the first RF antenna 101 to perform RF carrier signal detection. If the RF carrier signal is detected, proceed to Step 4; if no RF carrier signal is detected, go back to Step 1;

Step 4: the first RF transceiver module 101 detects RF carrier signal, generates an external interruption to wake up the first microcontroller 103 to enter a normal working mode;

Step 5: between the first RF transceiver module 101 of the RF SIM card 100 and the second RF transceiver module 201 of the RF card reader 200 (through their respective first RF antenna 102 and second RF antenna 202), exchange and process RF exchange data;

Step 6: the first microcontroller 103 and the second microcontroller 203 finish processing exchange data.

The first RF transceiver module 101 has an adjustable threshold value for activation by the electrical signal converted from the magnetic induction. The first RF transceiver module 101 of the RF SIM card 100 and the second RF transceiver module 201 of the RF card reader 200 work in the frequency ranges of super high frequency (SHF), very high frequency (VHF) or ultra high frequency (UHF) ranges.

The magnetic induction module 108 can include an induction coil, a Hall device, or a magnetic induction switch. The processing and conversion between the electrical signals and the magnetic signals can be performed inside the magnetic induction module 108, and can also be processed in the RF transceiver module 101 with appropriate circuits.

In accordance with the present invention, short-range communication methods and systems are provided to realize secure, range-controllable communications between an RF device (such as an RF card) or an RF mobile terminal (such as a cellular phone or a personal digital assistant) and an RF communication equipment (such as a POS—Point of Sale machine, or an RF reader).

An RF reader (such as an RF card reader) can have an RF transceiver, an RF antenna, a magnetic signal transmitter configured to generate a magnetic field and transmit a magnetic field signal, and a microcontroller configured to control the magnetic signal transmitter. In one embodiment, the magnetic field is a non-alternating magnetic field. The magnetic signal transmitter can be a magnetic transmission module, or comprise various components for generating the magnetic field signal.

From the principles of physics, the magnetic field energy decays quickly as the distance increases. The properties of the magnetic field are relatively insensitive to the ambient environment, and thus the magnetic field signal is relatively stable and reliable. However, an alternating magnetic field and a non-alternating magnetic field, such as a static magnetic field, have very different penetration capabilities through materials.

The field lines of an alternating magnetic field are constantly changing. Thus, a metal or conductive object in such a field inevitably will cut through the field lines, forming Eddy currents in the metal or conductive object, causing loss in the magnetic field strength, thereby reducing the penetration capability of the field. As described above, ISO 14443-based technologies use a 13.56 MHz alternating magnetic field for communications. However, if the coil is installed inside a terminal such as a cellular phone, the metal components and the metal shell of the mobile terminal can make it difficult for the magnetic field signal to transmit out of the mobile phone. This is particularly true for medium-frequency or high-frequency alternating fields, such those having a frequency higher than 125 kHz, for example higher than 1 MHz, such as the 13.56 MHz. Even if some of the magnetic signals penetrate the shell of the mobile terminal, the signals can be unstable or too weak for communications.

For a non-alternating magnetic field such as a static field, the field lines have little change in their directions and positions. If a metal object is adjacent to the magnetic field but does not move, there is no Eddy current formed in the metal object, and the magnetic field can easily pass through the metal. In one representative embodiment, the penetration capability of the non-alternating magnetic field is utilized to realize controllable-range secure communications, thus solving the problems of EM (RF) and high-frequency alternating magnetic fields, which can be difficult to transmit through mobile terminals or there is little control of the communication range.

The non-alternating magnetic field can have a low modulation speed. The resulting rate for data transfer may be lower than 1 kHz. However, in a representative embodiment disclosed herein, the RF reader only uses this magnetic field to transmit a very small amount of information to the RF card, for authentication purpose and to avoid malicious attack. Thus, non-alternating magnetic field still can be used.

In one example, an RF device (such as an RF SIM card) is disposed in a mobile terminal to add two different communication channels to the mobile terminal:

1) A first communication channel is a low-speed, one-way channel realized using a non-alternating magnetic field. The range is stable and controllable. The channel is used to transmit a small amount of information for identification or authentication purposes to avoid malicious interference and attacks. The RF reader can control a magnetic signal transmitter, according to a set of instructions, to vary the strength of the magnetic field, but with little or no variation in field distribution to avoid the Eddy currents, thereby increasing the capability of the penetration. The magnetic induction and receiving module can sense the change in the magnetic field strength, and obtain information from such variations, thus realizing the one-way information transfer from the RF reader and the RF SIM card.

2) Using RF transceivers to form a high-speed, second communication channel (e.g., RF channel) to complete identification and to perform the main transactions. The identification process can also use both the magnetic channel and the RF channel.

A magnetic field particularly a non-alternating magnetic field has an energy distribution that decays quickly with the increase of distance, and is less susceptible to environmental factors such as metal objects, conductive materials, or human bodies. Thus, using such a magnetic field to transmit information at a short range can be reliable and predictable.

The short-range secure communication system in accordance with the representative embodiments is based on these properties of the magnetic field. For example, the following method can be used to realize the secure communication:

a) The magnetic signal transmitter of the RF reader can have predetermined largest transmission strength. The magnetic induction and receiver module of the RF device can have predetermined reception sensitivity. The largest induction distance can be the target range, for example, 1 cm, 2 cm, 5 cm, 10 cm, 15 cm, or 20 cm, etc;

b) The RF reader controls its magnetic signal transmitter to transmit a magnetic field having a field strength variation according to certain instructions. The field distribution has little changes. The RF reader modulates its identification information A1 onto the magnetic field amplitude. The magnetic induction and receiver module of the RF device senses the magnetic field amplitude variation and extracts formation A2;

c) The RF SIM card sends A2 through the RF channel to the RF reader. The RF reader obtains information A3 from the RF channel. The RF SIM card can also add its identification information to A2, thereby realizing a two-way authentication process.

d) The RF reader compares A3 with A1. If they match, then it is determined that this transaction is initiated by the RF reader itself, and is legitimate. In addition, due to that the magnetic field cannot propagate to a long distance, it can be determined that the communication distance is within the predetermined range. Thus, normal transactions can be performed.

A1, A2, and A3 can be identical information. Alternatively, they can be processed information, such as codes encrypted with predetermined keys. This can better protect the security of the transactions.

Figure 5:
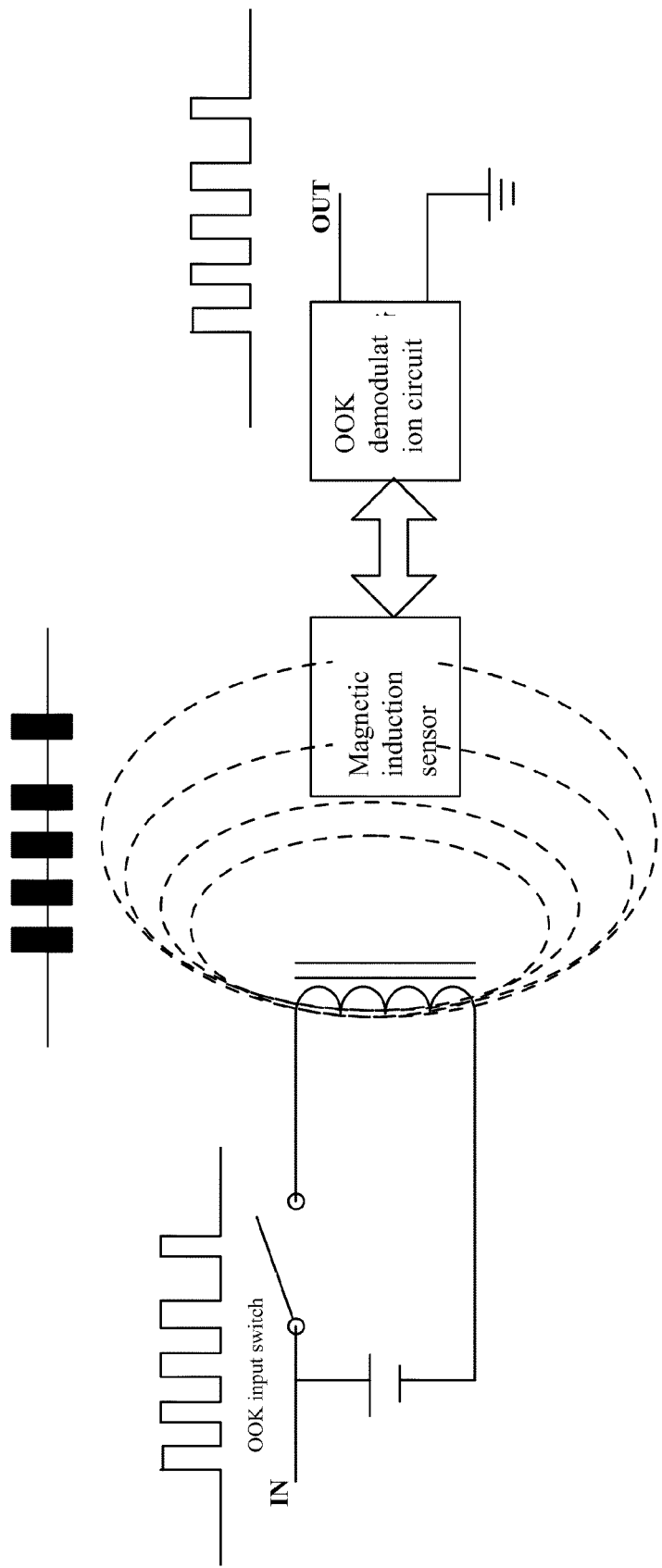
FIG. 5 is a diagram illustrating a simple magnetic communication OOK modulation scheme.

In the above step b), the RF reader can modulate information onto the magnetic field without significantly changing the field distribution. Many different modulation methods can be used, including:

I) On-Off Keying (OOK). This is a simple modulation format, where signal bits are modulated by turning on or off the magnetic field signal source. FIG. 5 is a diagram illustrating a simple magnetic communication OOK modulation scheme. As shown, the RF reader has an electromagnetic device and a switch. When the switch is closed, the electromagnetic device is activated and generates a static magnetic field. When the switch is open, the magnetic field disappears. The RF SIM card has a magnetic sensor, such as a Hall device or an induction coil. When the magnetic field exists, the magnetic sensor outputs a "high" electrical signal; if there is no magnetic field, the output is "low." Following a sequence of "1" or "0" to close or open the switch, correspondingly the magnetic field is generated or is turned off. The sensor outputs "high" and "low" electrical signals, corresponding to information bit "1" and "0," respectively, thereby realizing information modulation and transmission.

II) Time modulation. By controlling the transmission time of the magnetic transmitter, the duration of the magnetic field is modulated, and the magnetic sensor can sense the duration of the magnetic field. In one example, the duration of the magnetic field has a dichotomy. For example, a duration of 10 ms corresponds to "1," and a duration of 20 ms corresponds to "0."

III) Other modulation schemes include Manchester encoding, Pulse Width Modulation (PWM), Pulse Period Modulation (PPM), or other known methods in communications.

To reduce the power consumption of the RF SIM card, the magnetic induction and receiver module can be normally in a dormant state, and be periodically activated to check whether there is a magnetic field signal.

The magnetic induction and receiver module of the RF SIM card can be connected to the first RF transceiver, which has a signal processing function. The first RF transceiver can detect and extract the signal output from the magnetic induction and transceiver module and send the signal to the first microcontroller.

The mobile terminal itself can have a short-range RF communication functionality. The abovementioned first RF transceiver can be installed in the mobile terminal instead of the SIM card, to realize the short-range communication with the RF reader.

The magnetic detector can be one of a coil, a Hall device, or a magnetic induction switch.

The first and second RF transceivers can work in the super high frequency (SHF) band, very high frequency (VHF) band, or ultra high frequency (UHF) band.

In some embodiments, the magnetic field is a non-alternating magnetic field. In some other embodiments, the magnetic field is a low-frequency (e.g., <100 kHz) alternating magnetic field. In general, the lower the frequency is, the better the penetration capability the magnetic field has. However, for a low-frequency alternating magnetic field signal, it is preferable that the frequency is no lower than 0.1 kHz, otherwise the data transfer rate using the magnetic field signal would be too low. Thus, the low-frequency alternating magnetic field preferably has a frequency range of about 0.1 kHz-100 kHz. In one example, the low-frequency alternating magnetic field has a frequency in the range of about 1 kHz-30 kHz. In some examples, the low-frequency alternating magnetic field has a frequency of about 0.3 kHz, 0.5 kHz, 1 kHz, 2 kHz, 5 kHz, 10 kHz, 20 kHz, 30 kHz, 50 kHz, 60 kHz, or 80 kHz, etc.

Figure 4:
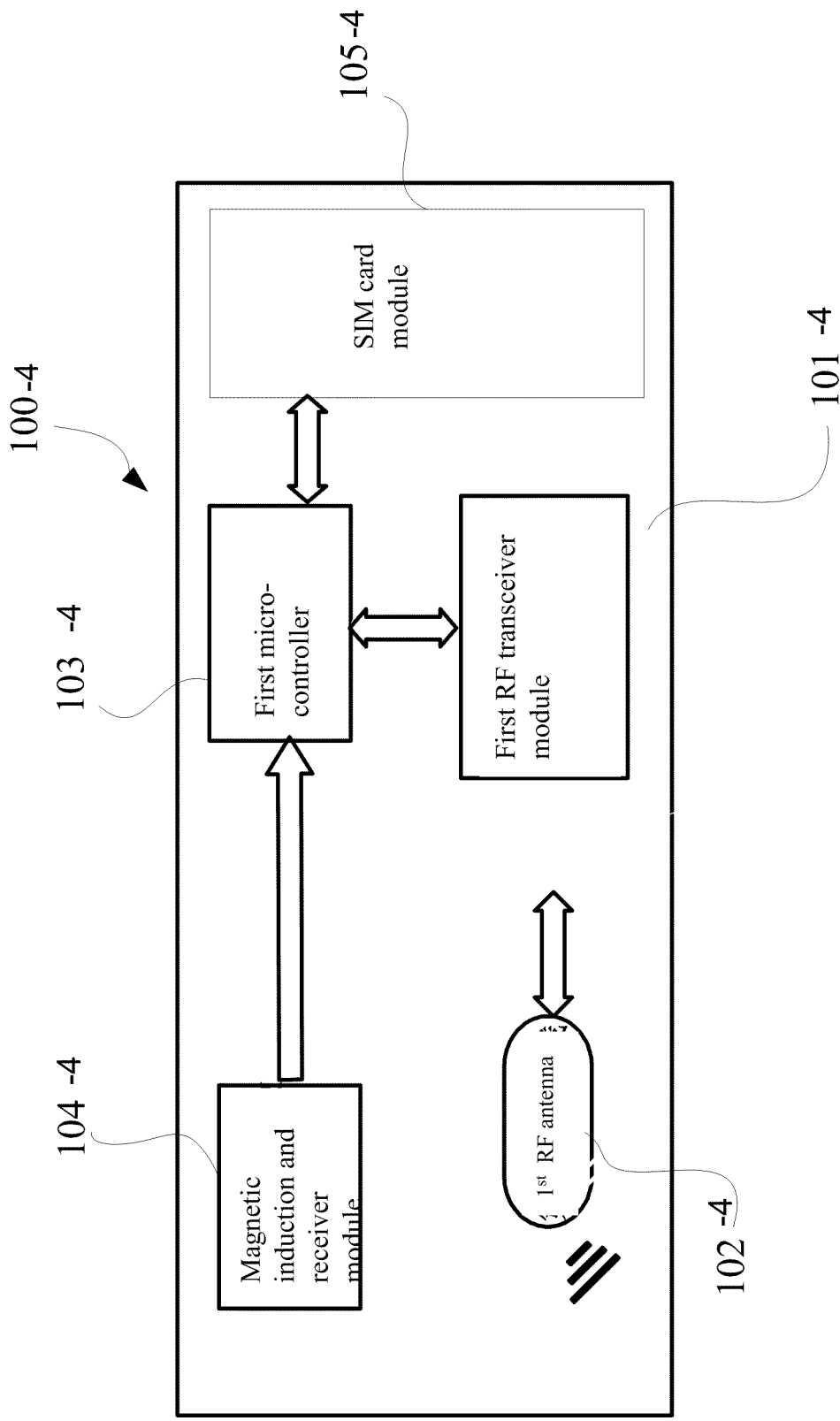
FIG. 4 is a schematic block diagram illustrating an RF SIM card according to one embodiment.

As illustrated in FIG. 4, which is a slight variant of FIG. 1, an RF device such as an RF SIM card 100-4 is provided including a SIM portion 105-4, a first RF transceiver 101-4, a first RF antenna 102-4, a magnetic detector such as a magnetic induction and receiver module 104-4 configured to detect a magnetic field signal, and a first microcontroller 103-4 configured to process the magnetic field signal. The first RF transceiver 101-4 can be electrically connected to the first RF antenna 102-4 and the first microcontroller 103-4. The magnetic induction and receiver module 104-4 can be electrically connected to the first microcontroller 103-4.

The magnetic induction and receiver module 104-4 can comprise a conventional coil, a Hall device, or a magnetic induction switch, or a Hall magnetic sensor combined with an analog-digital (A/D) converter circuit. The magnetic detector can have a predetermined detection range.

The RF transceiver and microcontroller can be in a dormant state if the magnetic detector does not detect a magnetic field signal. If the magnetic field signal is detected, the magnetic detector converts the detected magnetic field signal into an electrical signal. The electrical signal or instructions derived thereof can activate the RF transceiver and the microcontroller.

A predetermined threshold value can be used for comparison with the electrical signal to determine whether to activate the RF transceiver and the microcontroller. The threshold value can be adjustable.

In some embodiments, the RF transceiver, RF antenna, magnetic detector, and microcontroller are all integrated in an integrated circuit (IC) card. For example, the RF device 100 is, or is directly integrated onto, an integrated circuit (IC) card, an SDIO card, an SD card, an MMC card, a motherboard, or an apparatus shell. In a preferred embodiment, the RF device is a smart IC card such as an RF SIM card.

In some embodiments, the microcontroller of the RF device is a processor of an IC card, SDIO card, SD card, MMC card, or a motherboard.

The RF device can be disposed in a mobile terminal or a fixed terminal. The mobile terminal can be a cellular phone, a personal digital assistant (PDA), or a laptop computer, and the fixed terminal can be a personal computer, an industrial control computer, an automatic teller machine (ATM), or an access control terminal. In the case of a cellular phone, the RF device 100 can be a replaceable RF SIM card.

In some other embodiments, the RF device is not an integrated card. Rather, the components can be spread into different parts of the mobile terminal.

As illustrated earlier in FIG. 2, an RF reader 200 can be used with the RF SIM card 100 or 100-4. The RF reader includes the second RF transceiver 201, the second RF antenna 202, and the second microcontroller 203. The second RF transceiver 201 is electrically connected to the second RF antenna 202 and the second microcontroller 203. A Magnetic signal transmitter 204 is configured to generate a magnetic field, and is electrically connected to the second microcontroller 203.

The magnetic field can be a non-alternating magnetic field, or a low-frequency alternating magnetic field. The magnetic detector can be configured to transmit a variable-amplitude magnetic field as instructed by said microcontroller. The magnetic field can have a distribution that does not vary or has little variation. The magnetic detector can be designed to have a predetermined effective transmission range.

The magnetic signal transmitter 204 can use a permanent magnet, a DC-current electromagnet, or other magnetic elements, and can be configured to modulate instruction information onto said magnetic field signal. For example, the magnetic field can be an amplitude-variable magnetic field based on the preset instruction information. The magnetic field can have a distribution that does not vary or has little variation. The instruction information can be modulated onto the magnetic field signal through an on-off keying (OOK) or a time-modulation scheme. In a low-frequency OOK modulation scheme, a stronger field can be used to represent "1," and a weaker or absent field can represent "0." The digital signals are sent to the magnetic induction and receiver module 104-4, and are converted into digital electrical signals and forwarded to the first microcontroller 301 for processing.

A communication system thus can be formed that includes the RF device 100 or 100-4 and the RF reader 200, between which a communication range can be controlled through a magnetic field, and information can be exchanged through an RF channel. The RF device and the RF reader are further configured for identification through the magnetic field signal, or through both the magnetic field signal and the RF channel.

The communication method in the communication system involves controlling a communication range between two apparatuses using a magnetic field, and exchanging information between the two apparatuses through RF communication. The magnetic field is also used for authenticating at least one of the two apparatuses. In some embodiments, both the magnetic field and the RF channel are used for authenticating at least one of the two apparatuses. For example, the RF device sends the decoded instruction information directly to the RF reader through the RF channel. The identification passes only if the instruction information received by the RF reader match the preset instruction information.

The magnetic signal transmitter has a predetermined effective transmission range. The magnetic detector can also have a predetermined effective detection range.

When the RF SIM card 100-4 approaches the RF reader 200, the magnetic induction and receiver module 104-4 senses the magnetic field signal from the magnetic signal transmitter 204, and converts the magnetic signal into an electrical signal for the first microcontroller to process. The first microcontroller 103-4 analyzes the magnetic field strength variation, and extracts the field amplitude and other modulation information (e.g., through the OOK demodulation method), thereby realizing the information transfer between the RF reader 200 and the RF SIM card 100-4. The RF reader 200 and the RF SIM card 100-4 further realize RF signal communication through the first RF transceiver 101-4, and the second RF transceiver 201.

Figure 6:
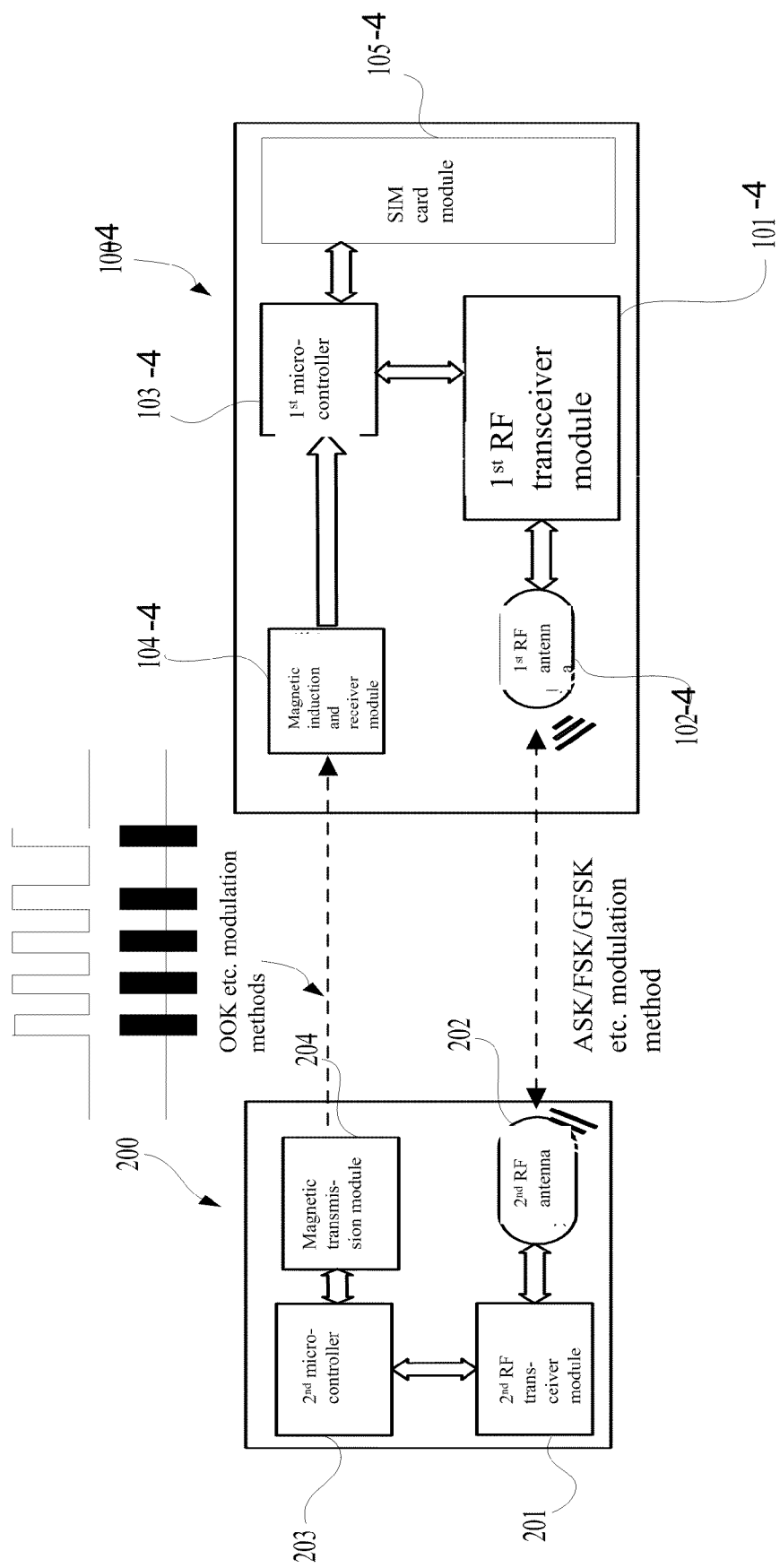
FIG. 6 is a system for controlling a communication range according to one embodiment.
Figure 7:
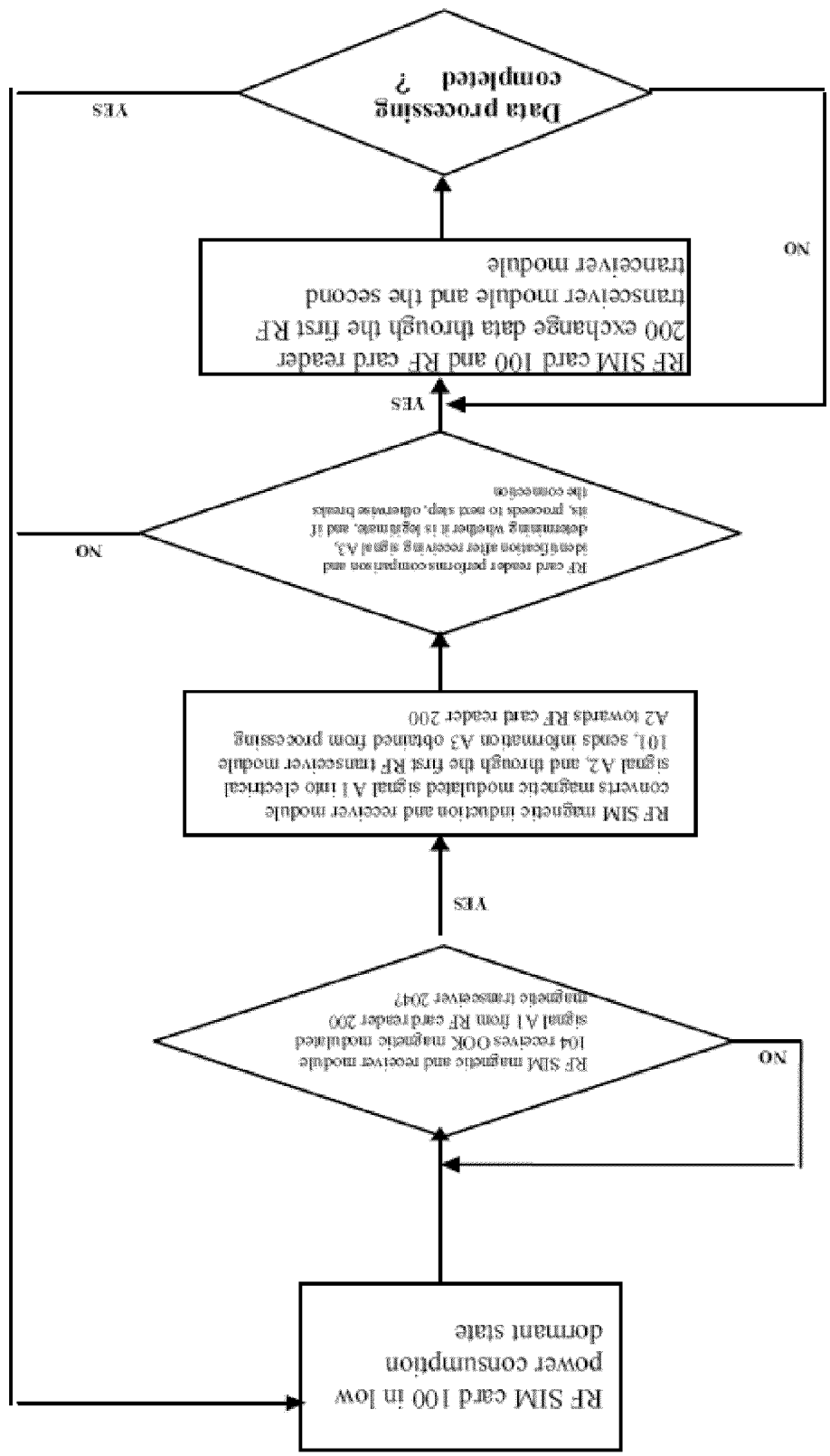
FIG. 7 is a flowchart of the range control process.

With reference to FIGS. 6 and 7, the RF communication method between the RF SIM card 100-4, which functions as a smart card, and the RF reader 200 is described.

Step 1: In a normal state, for example, when the RF SIM card 100-4 is far away from the RF reader, the first RF transceiver 101-4 and the first microcontroller 103-4 are in a dormant state. The RF SIM card 100-4 does not transmit or receive data through the first RF transceiver. The whole card is in a lowest power consumption state.

Step 2: When the RF SIM card 100-4 approaches the RF reader 200, the RF SIM card 100-4 is in the magnetic field of the magnetic signal transmitter 204 of the RF reader 200, and the magnetic induction and receiver module 104-4 senses the magnetic field signal A1 from the magnetic signal transmitter 204. The magnetic field signal A1 can be an OOK modulation signal, or can be a signal modulated by controlling the magnetic field transmission time.

Step 3: The sensed magnetic field signal is processed and converted to an electrical signal A2, which activates the first RF transceiver 101-4. Alternatively, an electrical signal threshold can be set to determine whether to active the first RF transceiver. The RF SIM card 100 processes information A2 and forms information A3, which is sent to the RF reader through the RF channel formed by the first RF transceiver and the second transceiver module.

Step 4: The RF reader authenticates the received information A3, and if it is determined that this transaction is initiated by the RF reader itself, based on the fact that the magnetic field cannot radiate very far, it can be determined that this transaction is a legitimate transaction within the effective communication range. If the authentication process does not pass, the RF reader breaks the communication.

Step 5: If it is determined that this transaction is a legitimate transaction, the first RF transceiver 101-4 of the RF SIM card 100-4 and the second transceiver module 201 of the RF reader 200 (through their respective first and second RF antennas 102-4, 202) exchange RF transaction data.

Step 6: The first and second microcontrollers 103-4, 203 finish processing the transaction data.

In one embodiment, the threshold value for the first RF transceiver being activated by the electrical signal converted through the magnetic induction is adjustable.

The threshold value can be realized as a voltage value or a current value in an analog circuit, or a binary sequence code in a digital circuit. For example, if the RF SIM card 100-4 uses a binary code "10011101" as the activation threshold value in a digital circuit, then only when the RF reader 200 transmits the binary code "10011101," and the RF SIM card 100-4 detects and demodulates the signal "10011101," the two RF devices can be paired and enter subsequent communication process.

Figure 8:
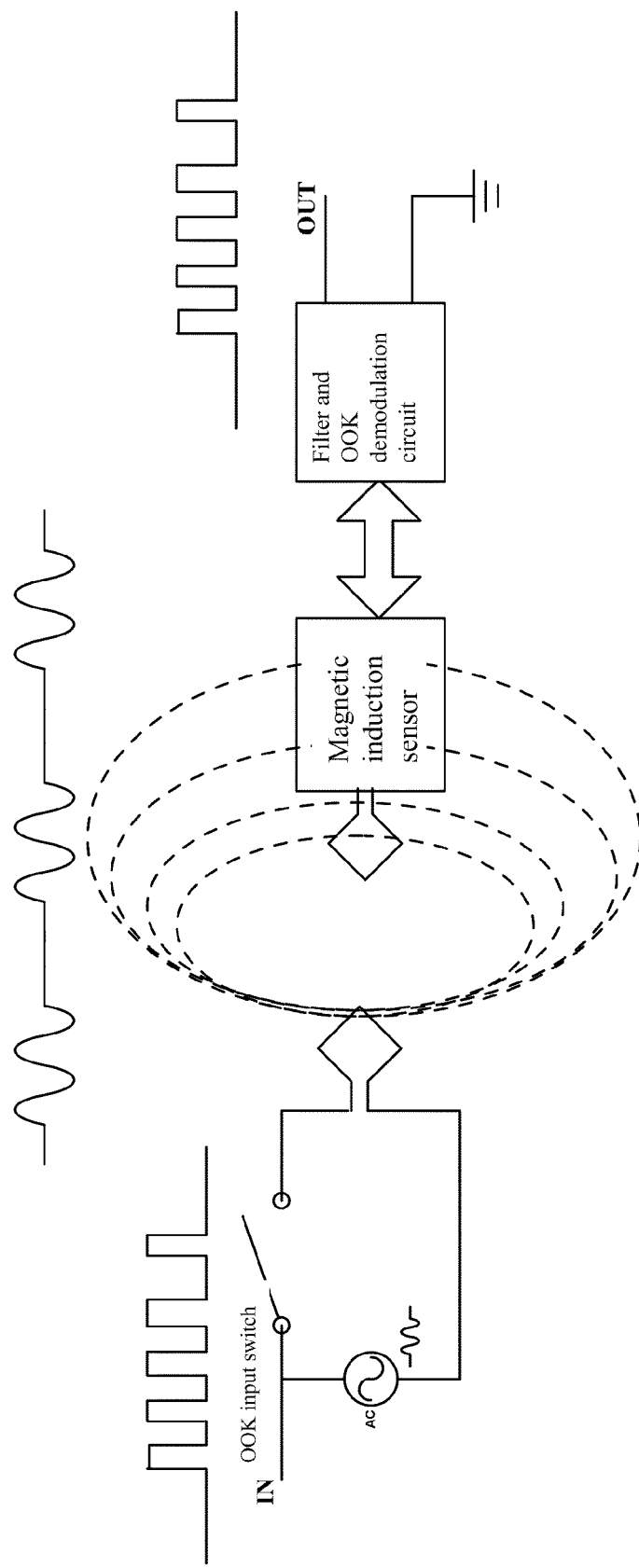
FIG. 8 is a schematic diagram illustrating the short-range communication process according to one representative embodiment.

FIG. 8 is a schematic diagram illustrating the short-range communication process according to one representative embodiment. As shown, the RF reader includes a low-frequency signal generator, a coil antenna, and a switch. If the switch is closed, the low-frequency signal generates a low-frequency alternating magnetic field from the coil. If the switch is open, the low-frequency alternating field disappears. The RF SIM card includes a magnetic induction coil or magnetic field sensor. If the alternating magnetic field exists, the coil or sensor outputs an alternating current. If there is no magnetic field, the output is in a low electrical level. Closing or opening the switch according to a bit "1" or "0" sequence, the magnetic sensor can output corresponding electrical signals, which can be demodulated to obtain the bits "1" and "0" through the filter and OOK demodulation circuit.

Figure 9:
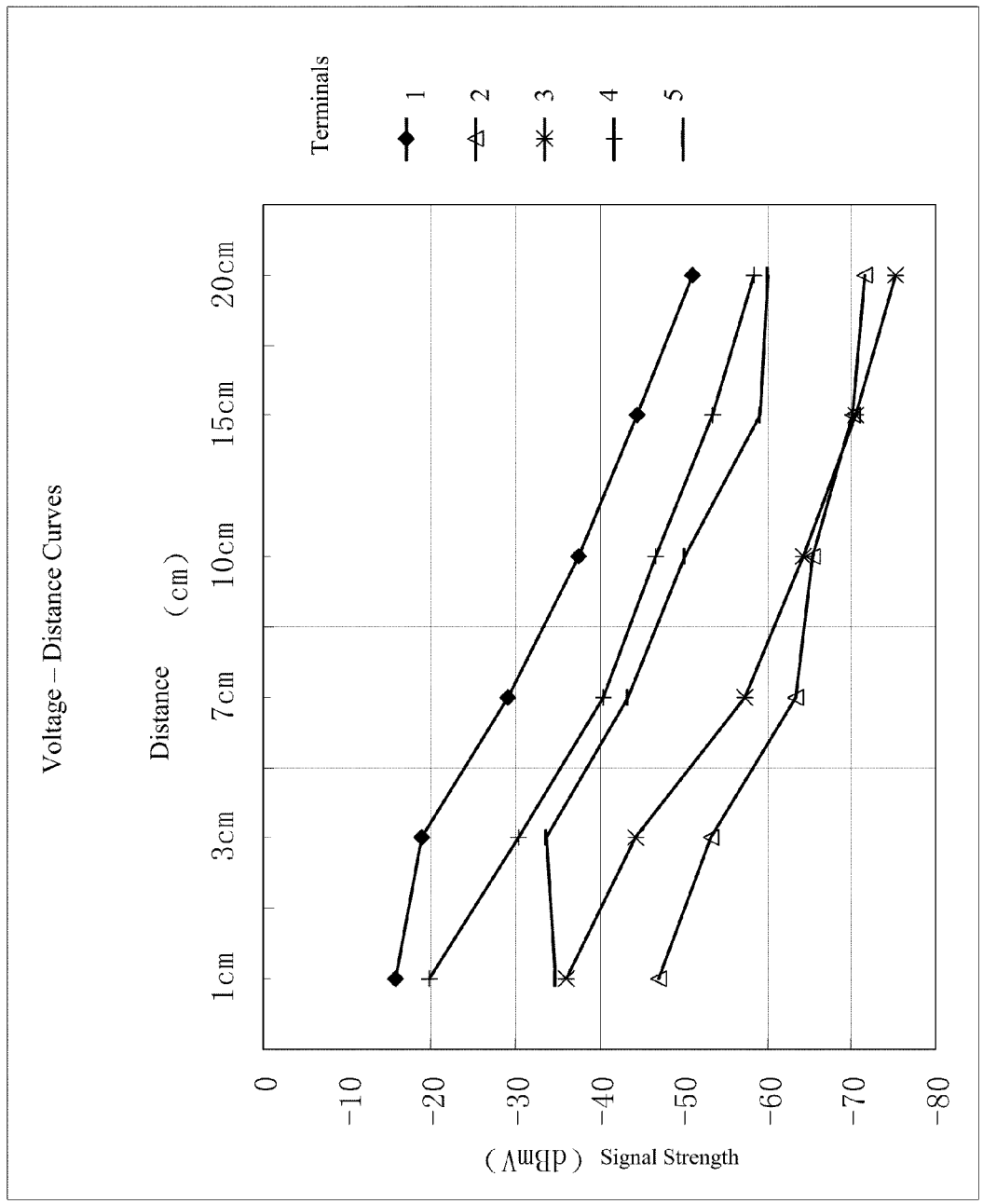
FIG. 9 illustrates voltage-distance curves measured for a same ISO 14443 POS apparatus with a fixed 13.56 MHz carrier wave disposed in different mobile terminals.

FIG. 9 shows the measured voltage-distance curves for the coil reception circuit disposed in various mobile terminals, in the condition of maintaining a fixed 13.56 MHz carrier wave in the same 14443 POS apparatus, where the signal strength value is the induction voltage of the reception antenna, after necessary amplification, wherein the amplification is kept at a constant. It can be seen that the variations in the field strengths received by different terminals are >30 dB, and that the filed strength variation from 1 cm to 10 cm for the same terminal is about 25 dB. Thus, the variation in the field strength caused by the differences in mobile terminals has surpassed the variation in the field strength, over the distance control range of 1 cm to 10 cm of the terminal.

Methods and systems are provided herein having much smaller variations in the field strength caused by the mobile terminals compared with the abovementioned technologies based on the 13.56 MHz carrier wave. Short-range communication functionalities can be added to various types of terminals by adding, for example, an RF device to the terminals. These terminals can perform electronic payment and other transactions without the calibration process of conventional terminals. These terminals can be, for instance, mobile terminals such as cellular phones, personal digital assistants (PDAs), and laptop computers. In one example, the RF device can be an RF SIM card disposed in a cellular phone in place of a conventional SIM card that does not have an RF functionality. In some other examples, the RF device can be a UIM card, a USIM card, a TF card, or an SD card of a mobile terminal. The RF device can be a "plug-and-play" device.

The communication range between the RF device or the terminals having the RF device disposed therein and an RF reader such as a card reader can be important for the security of the communication.

Embodiments disclosed herein provide a communication method that can effectively control the range for the short-distance communication. The method includes transmitting a low-frequency alternating magnetic field signal from an RF reader, wherein the low-frequency alternating magnetic field signal includes an identification information of the RF reader; determining whether an RF device is in a predetermined effective communication range of the card reader based on the low-frequency magnetic field signal detected by the RF device; authenticating the RF device; and performing a transaction between the RF reader and the RF device through an RF channel.

The method uses the low-frequency alternating magnetic field signal for the range control, as the low-frequency alternating magnetic field signal has a relatively small variation in attenuation for different terminals (such as different models of cellular phones), where the RF device (such as an RF SIM card) is disposed therein. RF, particularly high-frequency RF is used for two-way high-speed communications for transactions because high-frequency RF waves can effectively transmit through various terminals.

The transmitting can be based on predetermined transmission parameters including a frequency of the low-frequency alternating magnetic field, wherein the frequency of the low-frequency alternating magnetic field can be less than or equal to a highest system working frequency f0 without calibration.

The determining process can include converting the low-frequency alternating magnetic field signal into an electrical signal; amplifying the electrical signal into a voltage signal; and comparing the voltage signal with a predetermined threshold value, such as a voltage threshold Vt; wherein the predetermined threshold value can be the same for different mobile terminals having the RF device disposed therein due to the low attenuation variation in the low-frequency alternating magnetic field signal through different terminals. Thus, there may be no need for calibrating Vt.

The authenticating can include sending an identification information of the RF device and the identification information of the card reader from the RF device to the card reader; and comparing the identification information of the card reader received at the card reader with an identification information stored at the RF reader; wherein said performing a transaction is conducted only if said comparing yields a matching result.

A combination address can be formed using the identification information of the RF reader and the identification information of the RF device, and the transaction can be performed using the combination address.

The mobile terminal having an RF device disposed therein can be uniquely paired with an RF reader through a low-frequency, one-way, communication, and an RF, two-way, communication. After the pairing, the RF channel can be used for the two-way high-speed communication to exchange a large amount of data. The communication range for such a transaction can thus be effectively controlled, and there is no need for calibration for different terminals (such as cellular phones) having the same RF device installed therein.

In one embodiment, a short-range communication system is provided including an RF reader configured to transmit a low-frequency alternating magnetic field signal including identification information of the RF reader, and an RF device. The RF reader or the RF device, or both, is configured to determine whether the RF device and the RF reader are in a predetermined effective communication range based on the low-frequency alternating magnetic field signal detected by the RF device. The RF reader or the RF device, or both, is further configured to authenticate the other of the RF reader or the RF device through, the low-frequency alternating magnetic field signal, or also though an RF channel. The RF reader and the RF device are also configured to perform a transaction therebetween through an RF channel.

The short-range communication process can be performed, for example, via the following steps a-d.

Step a, the RF reader transmits a low-frequency alternating magnetic field signal including identification information of the RF reader. The predetermined transmission parameters include a frequency of the low-frequency alternating magnetic field, wherein the frequency of the low-frequency alternating magnetic field is less than or equal to a highest system working frequency f0 without calibration. The identification information can include an identification code (ID).

The frequency of the low-frequency alternating magnetic field can be defined as the frequency corresponding to the 3 dB bandwidth of the power spectrum near the high-frequency cutoff point.

Figure 10:
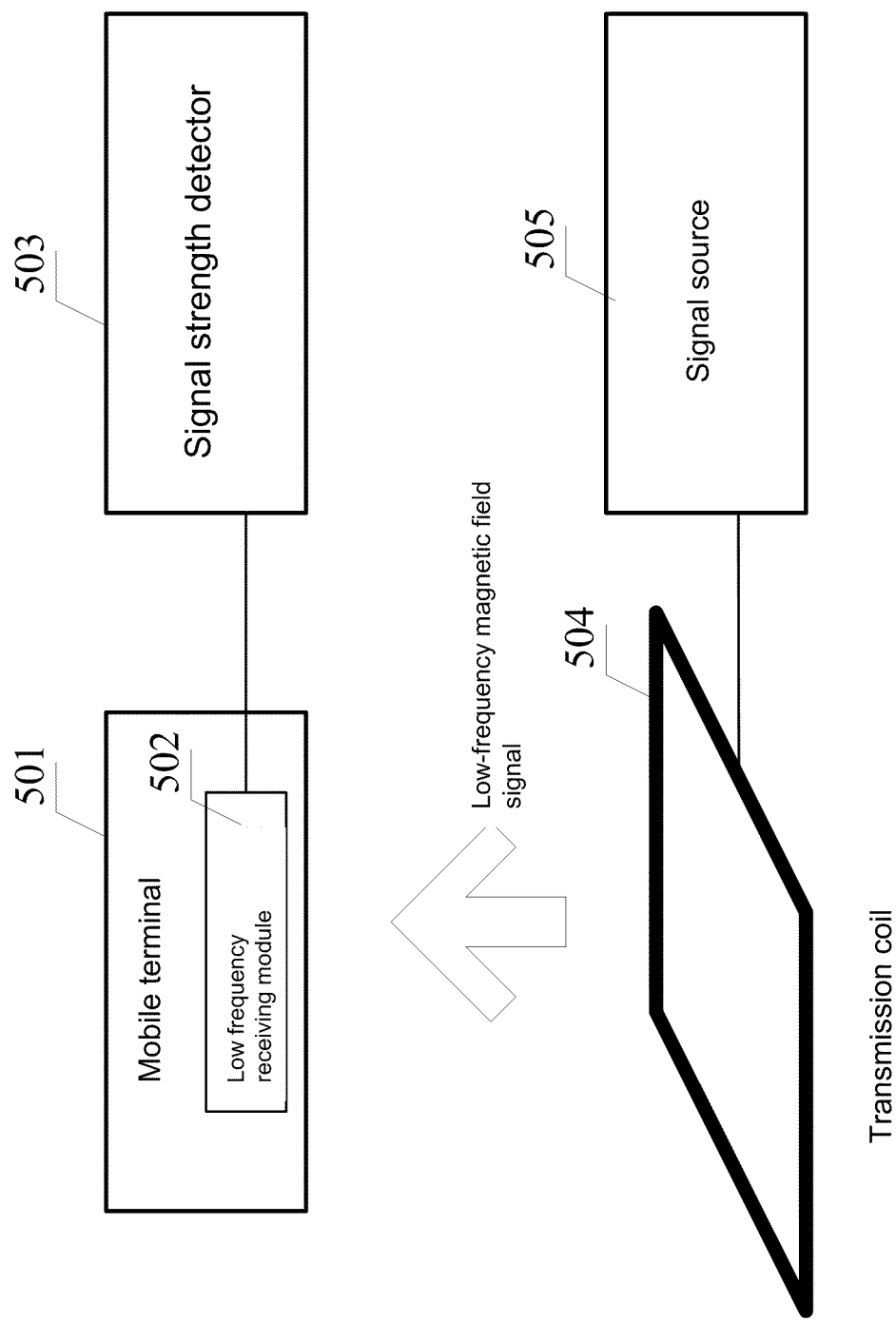
FIG. 10 is a schematic diagram of a selecting system for selecting a highest working frequency f0 for a communication system without calibration.

In general, the lower the frequency of the low-frequency alternating magnetic field is, the lower the attenuation variation for different typical terminals will be. Using this property, a frequency selection system (as illustrated in FIG. 10) selects a frequency point with sufficiently small attenuation variations to realize range control without calibration. A standard signal source transmits the low-frequency alternating magnetic field signal through a standard magnetic field transmission coil, and such a signal is detected in various typical mobile terminals through typical obstacles. An electrical signal, such as a voltage signal or a current signal, can be converted and amplified from the detected magnetic signal. By adjusting the frequency f of the low-frequency alternating magnetic field, a frequency f0 can be located such that at a system working frequency f≤f0, at the same distance to the center of the transmission coil plane, with typical obstacles, the variation in the electrical signal for various typical terminals is within a predetermined range $\delta_T$. Thus, for f≤f0, there is no need to calibrate the different terminals. For f>f0, calibrations may be needed. The higher f is, more terminals may need to be calibrated to compensate for their differences in attenuation properties, and more complex the compensation can become. The selection of f0 can be a one-time process, and there may be no need to change f0 during the operation of the system once it is selected.

FIG. 10 is a schematic diagram of a selecting system for selecting a highest working frequency f0 for a communication system without calibration. The selecting system includes a transmission system including a signal source 505 and a low-frequency magnetic field transmission coil 504, and a receiving system including a typical mobile terminal 501 and obstacles, and a signal strength detector 503 (such as a voltammeter, an oscilloscope, a spectrometer, etc.). The mobile terminal 501 has a low-frequency receiver module 502 disposed therein. The signal source 505 can generate a fixed-amplitude, sine-wave signal, which is transmitted through the transmission coil 504.

The low-frequency receiver module 502 receives the low-frequency signal, and sends the signal, converted to an electrical signal, to the signal strength detector 503 through a dedicated signal line. The signal strength detector 503 detects the received electrical signal. By varying the distance between the mobile terminal and the RF reader, a voltage-distance curve can be obtained for the mobile terminal with its associated obstacle for the frequency f. Changing the mobile terminals and obstacles, a plurality of different curves can be obtained. Changing f can also lead to different curves for different frequencies.

In step a, the highest frequency f0, above which calibration may be needed for the system, can be determined through the following steps.

Step 101, determining a system range control target (Din, Dv), wherein Din represents an effective communication range between the terminal having the RF device disposed therein and the RF reader. Within the effective communication range a transaction (corresponding to a card-swiping transaction in conventional card-reader systems) between the RF device and the RF reader can be guaranteed. Dv represents a range of distance variation, wherein within a distance between Din and Din+Dv the transaction can still be performed. Beyond a distance of Din+Dv, however, the transaction is not allowed. 0–Din+Dv is referred to as the "controlled range."

For instance, in a system with Din=5 cm and Dv=5 cm, (5 cm, 5 cm) represents that within 5 cm all terminals can be guaranteed to perform the transaction, in 5 cm-10 cm it is still possible to perform the transaction, and beyond 10 cm the transaction is not allowed. The specific controlled range is determined by the specific applications.

Step 102, determining a detection voltage variation range $\delta_R$ of the RF device caused by the RF reader.

The low-frequency transmission circuit of the reader device can have a variation in the transmitted field strength, for example, caused by the fluctuations in the transmission parameters. This leads to the variation in the detected voltage in the RF device of the mobile terminal. The fluctuations in the transmission parameters can be caused by, for example, fluctuations in the drive voltage, fluctuations in the coil parameters, changes in the temperature, etc. $\delta_R$ can be controlled by the design and manufacturing processes of the RF reader, for example, and can be calibrated during the production of the RF reader. Because the frequency f can be selected to be very low, $\delta_R$ can be well controlled, for example, within 4 dB.

Step 103, determining a detection voltage variation range $\delta_C$ of the RF device caused by the RF device itself.

The RF device can have variations in its parameters that cause the variations in the detection voltage. These variations in parameters can include, for example, errors in the receiver antenna, errors in the amplification gain, errors in the comparator or analog-to-digital (AD) converter, variations in the temperature, and noise, etc. $\delta_C$ can be controlled by the design and manufacturing processes of the RF device, for example, and can be calibrated during the production of the RF device. Because the frequency f can be selected to be very low, $\delta_C$ can be well controlled, for example, within 4 dB.

Step 104, measuring voltage-distance curves for various typical types of terminals and obstacles under a frequency f.

Before performing this step, typical terminals and typical obstacles are selected. Typical terminals are selected based on, for example, the amount of metal or conductive structures in the terminals. For terminals with more metal or conductive structures, the attenuation will be larger. Mobile terminals having outer shells made of plastic, metals of different thicknesses, and having different sizes can be selected. The terminals selected for testing should cover the typical attenuation characteristics of the terminals for the low-frequency alternating magnetic signals. Typically several representative terminals are sufficient for the measurements described herein.

To avoid overly large variations caused by individual mobile terminals, the individual terminals can be identified and individually tested for the transactions, to make sure that these terminals can perform the transactions. Typical obstacles can include materials often used in mobile terminals, such as plastic, aluminum, copper, iron, stainless steel, etc, with various shapes. These selected typical obstacles are placed between the RF reader and the RF device during the test to include the attenuation effects of the typical obstacles.

Step 105, determining a detection voltage variation range $\delta_A$ of the RF device based on the system range control target (Din, Dv), wherein $\delta_A$ equals a voltage difference between a first voltage value and a second voltage value, wherein the first voltage value corresponds to Din in a voltage-distance curve having an average field attenuation curve slope obtained from the voltage-distance curves for various typical types of terminals and obstacles, wherein the second voltage value corresponds to (Din+Dv).

Figure 11:
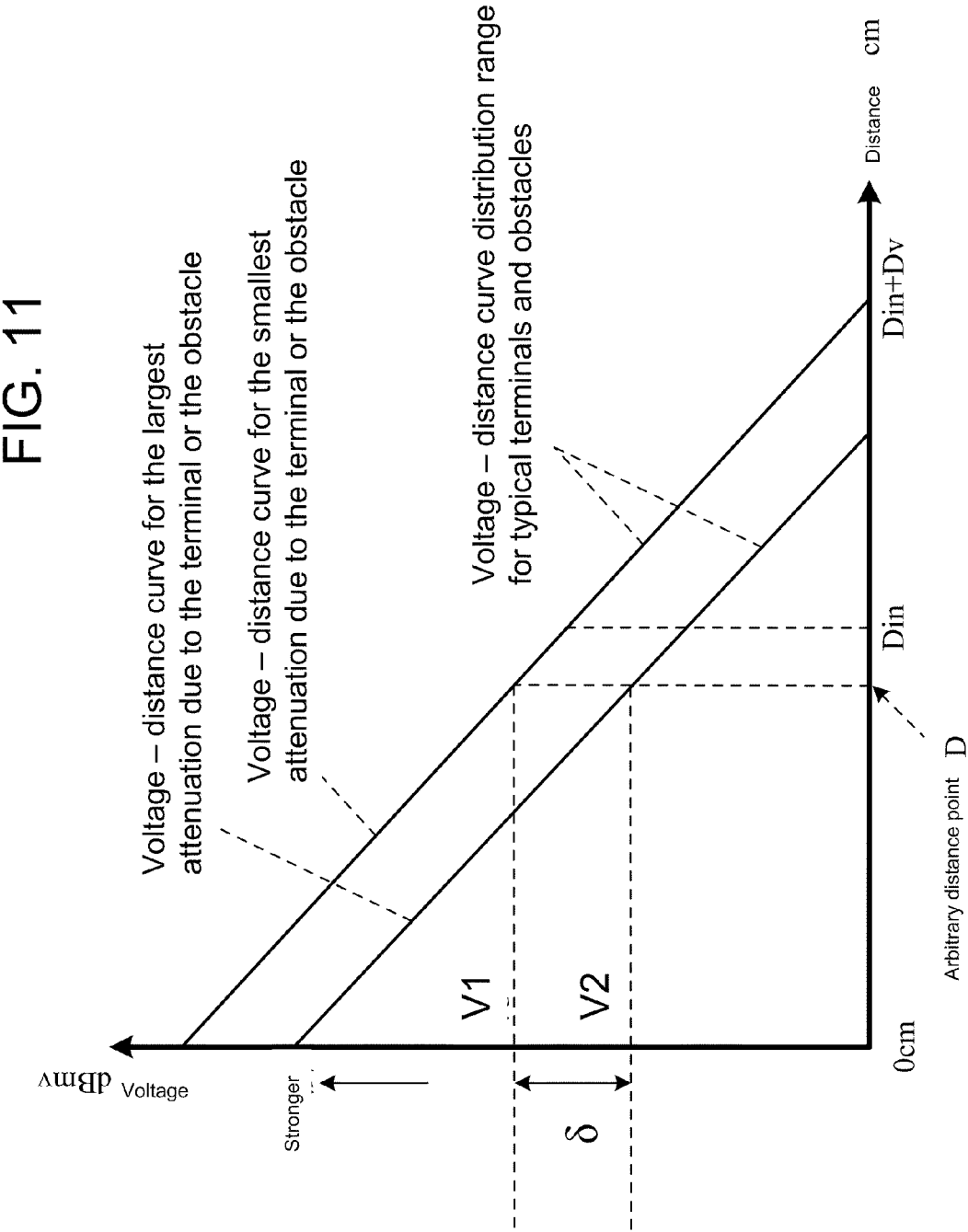
FIG. 11 is a graph illustrating the determination of total variation range $\delta_A$ of the detection voltage of the system based on the range control target (Din, Dv).

FIG. 11 is a graph illustrating the determination of a total variation range $\delta_A$ of the detection voltage of the system based on the range control target (Din, Dv). Din corresponds to a voltage V1, and Din+Dv corresponds to a voltage V2, and $\delta_A$=V1−V2.

Step 106, determining a variation range $\delta_T$ of a detection voltage in the RF device resulting from attenuation characteristics of the mobile terminal, wherein $\delta_T=\delta_A-\delta_R-\delta_C$.

Step 107, calculating a largest field strength variation $\delta$ (also referred to as a variation range) at a plurality of locations for various typical terminals and obstacles in a distance control range. If $\delta > \delta_T$, then reducing the frequency f, and repeating the measuring step; if $\delta < \delta_T$, then increasing the frequency f, and repeating the measuring step; if $\delta = \delta_T$, then the present testing frequency equals the system highest working frequency $f_0$, above which no calibration may be needed.

Figure 12:
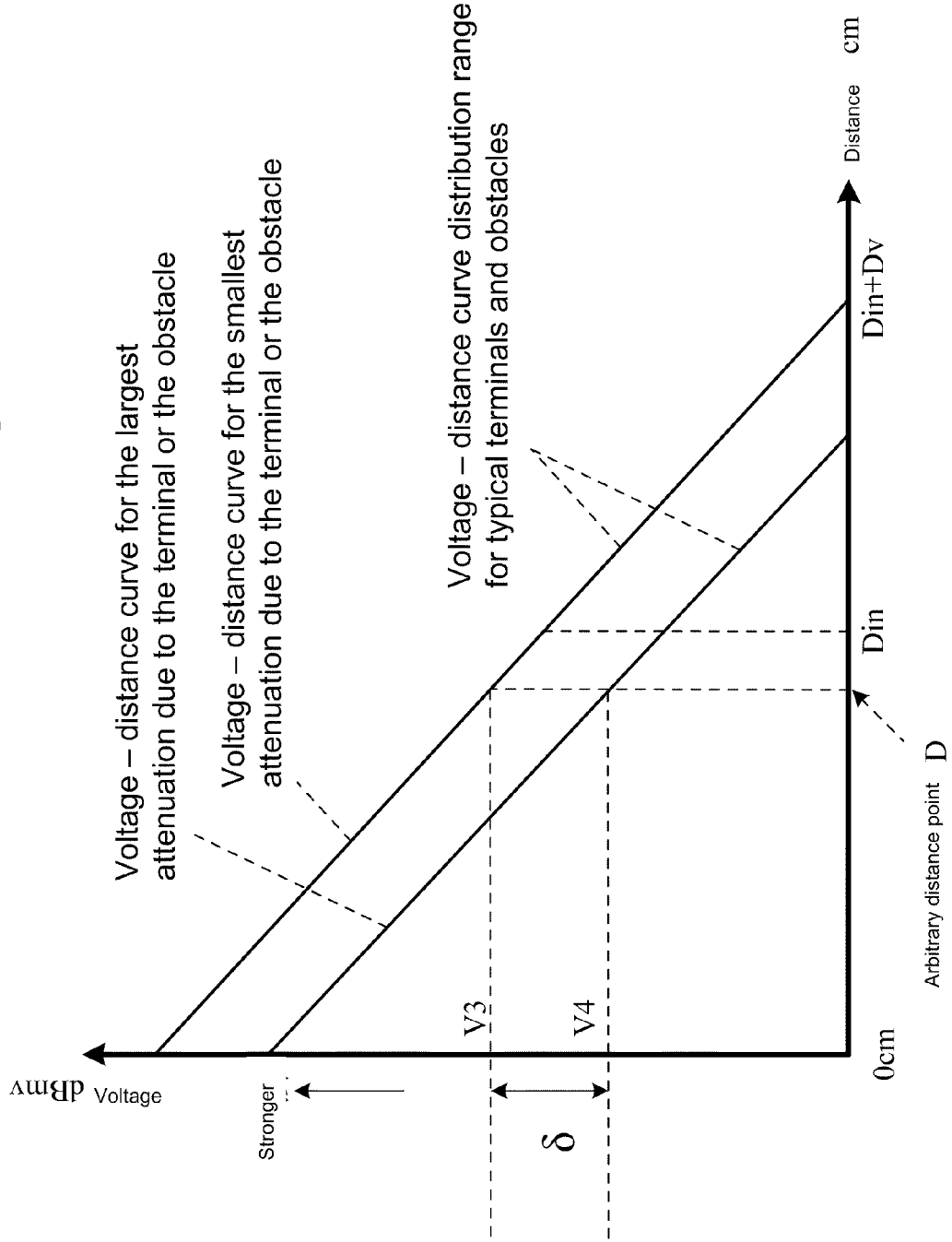
FIG. 12 is a graph illustrating voltage-distance curves and their variation range $\delta$ for typical terminals and obstacles.

FIG. 12 is a graph illustrating voltage-distance curves and their variation range $\delta$ for typical terminals and obstacles. As shown, the voltage-distance curve having the largest attenuation due to the terminal or obstacle is referred to as the largest attenuation curve, and the voltage-distance curve having the smallest attenuation due to the terminal or obstacle is referred to as the smallest attenuation curve. The area between these two curves is referred to the voltage-distance distribution range for typical terminals and obstacles. An arbitrary distance D has a corresponding voltage V3 on the smallest attenuation curve, and a corresponding voltage V4 on the largest attenuation curve, and $\delta$=V3−V4.

Thus, within a range control target, the highest working frequency f0 for the system can be determined. The system can adopt a signal modulation, or a direct transmission of base-band signals. So long as the main frequency component of the system is not higher than f0, the range control does not need calibrations.

Figure 13:
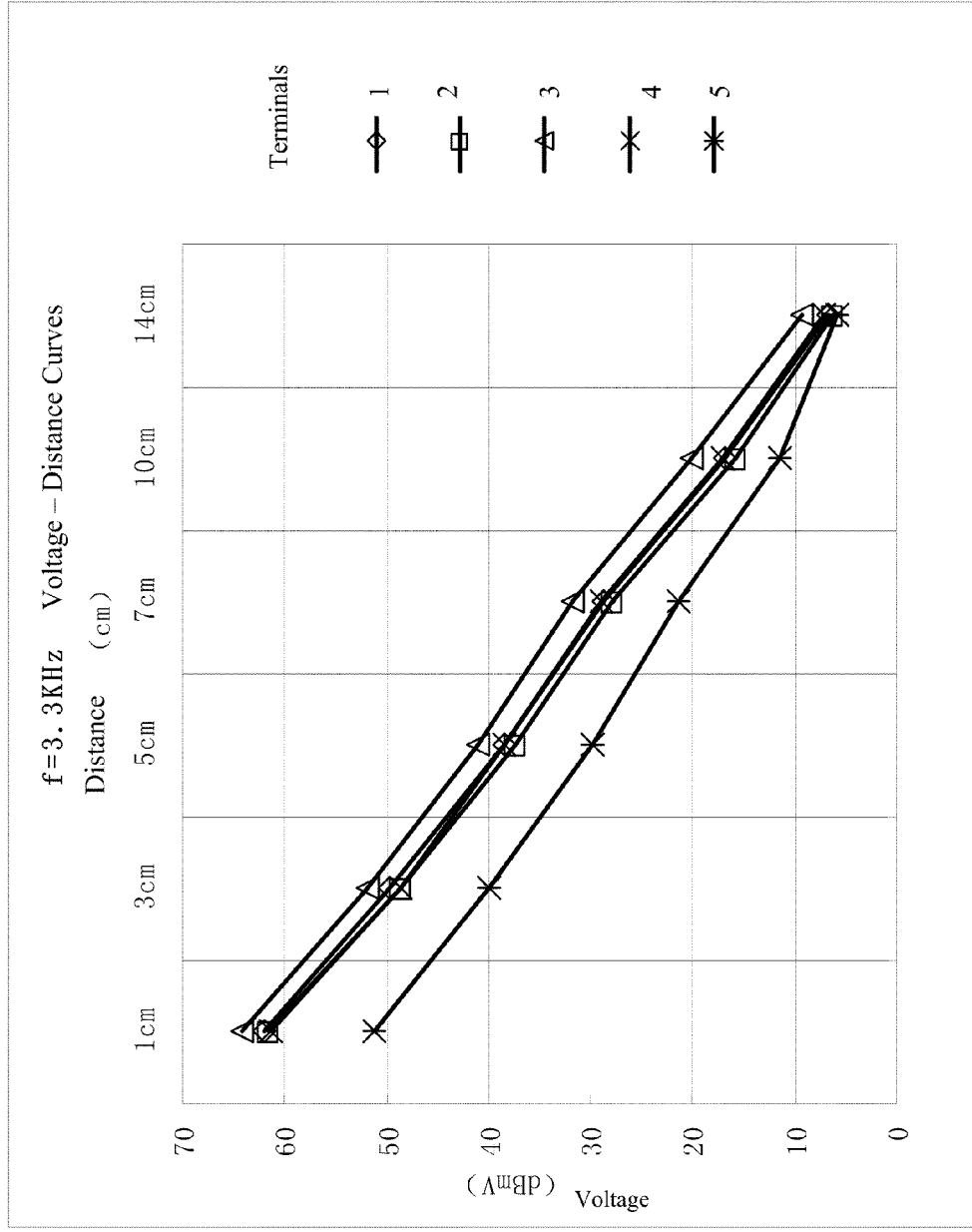
FIG. 13 illustrates voltage-distance curves measured for 5 different typical mobile terminals for an f=3.3 kHz.

The following is an example of a determination of f0 with reference to FIG. 13. FIG. 13 illustrates voltage-distance curves measured for 5 different typical mobile terminals for an f=3.3 kHz. As shown, the system has a range control target of (5 cm, 5 cm). Within the 0-10 cm range the voltage has a variation range of about 40 dB. The voltage variations caused by the RF reader and by the mobile RF device are both 4 dB, i.e., $\delta_R=\delta_C$=4 dB, $\delta_A$=20 dB, $\delta_T=\delta_A-\delta_R-\delta_C$=12 dB. If the 5 types of terminals can represent all the terminals used by the system, and the largest variations at various distances on the curves are approximately 12 dB. Thus, f0 can be determined to be about 3.3 kHz.

In step a, the transmission parameters can further include a modulation scheme, an encoding scheme, and a transmission magnetic field strength amplitude Br. The transmission parameters can be selected such that the RF device in the mobile terminal has a detected and amplified signal, which is converted from the low-frequency alternating magnetic signal, that has a fixed amplitude corresponding to distance. Although in the examples discussed above the signal is referred to as a voltage signal, other electrical signals such as a current can also be used.

Figure 14:
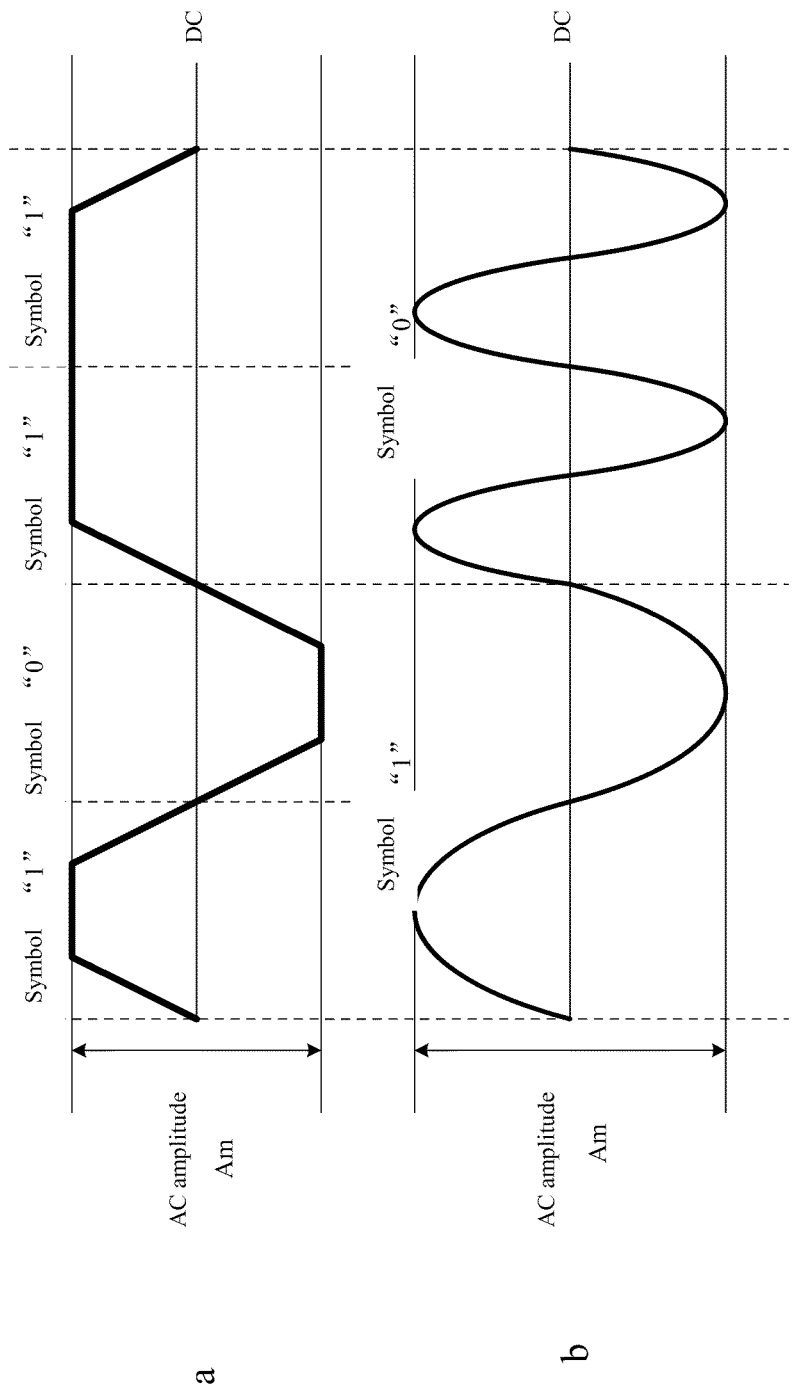
FIG. 14 shows the voltage signal without modulation and the voltage signal with a sine-wave FSK modulation detected by the RF device.

FIG. 14 shows (a) the voltage signal without modulation and (b) the voltage signal with a sine-wave FSK modulation detected by the RF device. As shown, the detected voltage is a variable electrical signal that includes demodulation information. The signal can be an alternating voltage signal with or without a DC component. The "fixed amplitude" refers to that the AC component has its largest amplitude the same between different (+, −) signs.

The modulation scheme, the encoding scheme, and Br can be selected based on the following steps a11-a13.

Step a11, selecting an encoding scheme without an average DC component, such as a Manchester encoding, a differential Manchester encoding, or a return-to-zero encoding.

Step a12, selecting a carrier modulation scheme without an amplitude variation or a modulation scheme variation. The carrier wave can be a sine wave, a pulse wave, a triangle wave, etc. The modulation scheme can be one of an on-off keying (OOK), a phase-shift keying, or a frequency-shift keying (FSK). When adopting a no-modulation scheme, the encoded base band signal can be directly transmitted by the transmission coil through the driver circuit.

Step a13, selecting Br, including: under the selected <f0 working frequency, encoding scheme and carrier modulation scheme, selecting a terminal having a typical noise, a gain parameter for the magnetic detection and amplification in the mobile RF device, testing an internal noise voltage amplitude Vn of a detection voltage within the mobile RF device in a condition that the RF reader does not transmit the low-frequency alternating magnetic field signal, and subsequently measuring an internal detection voltage Vr of the mobile RF device under a condition that the RF reader transmits the low-frequency alternating magnetic field signal with the selected modulation encoding scheme, selecting Br such that Vr/Vn>SNR, wherein SNR is a signal-to-noise ratio of the mobile RF device. In general it is preferred to have the SNR as large as possible. If the SNR is too large, however, the RF reader is required to have a large power, which is difficult to realize. Accordingly, it typically is selected that SNR=10. Once SNR is determined, Br can be determined using the above-described method.

Step b, the RF device receives the low-frequency alternating magnetic field signal at various distances, and converts and amplifies the signal into a fixed-amplitude voltage signal. It is further determined, through the predetermined threshold value Vt, whether the RF device is within the predetermined effective range. Vt can be the same for various mobile terminals having the same RF device disposed therein.

In Step b, Vt can be determined through the following Steps 201-203.

Step 201, under the selected transmission parameters, measuring voltage-distance curves for various typical terminals and obstacles, wherein the transmission parameters include a frequency of the low-frequency magnetic field signal, a modulation scheme, an encoding scheme, and a transmission magnetic field strength amplitude Br.

Figure 15:
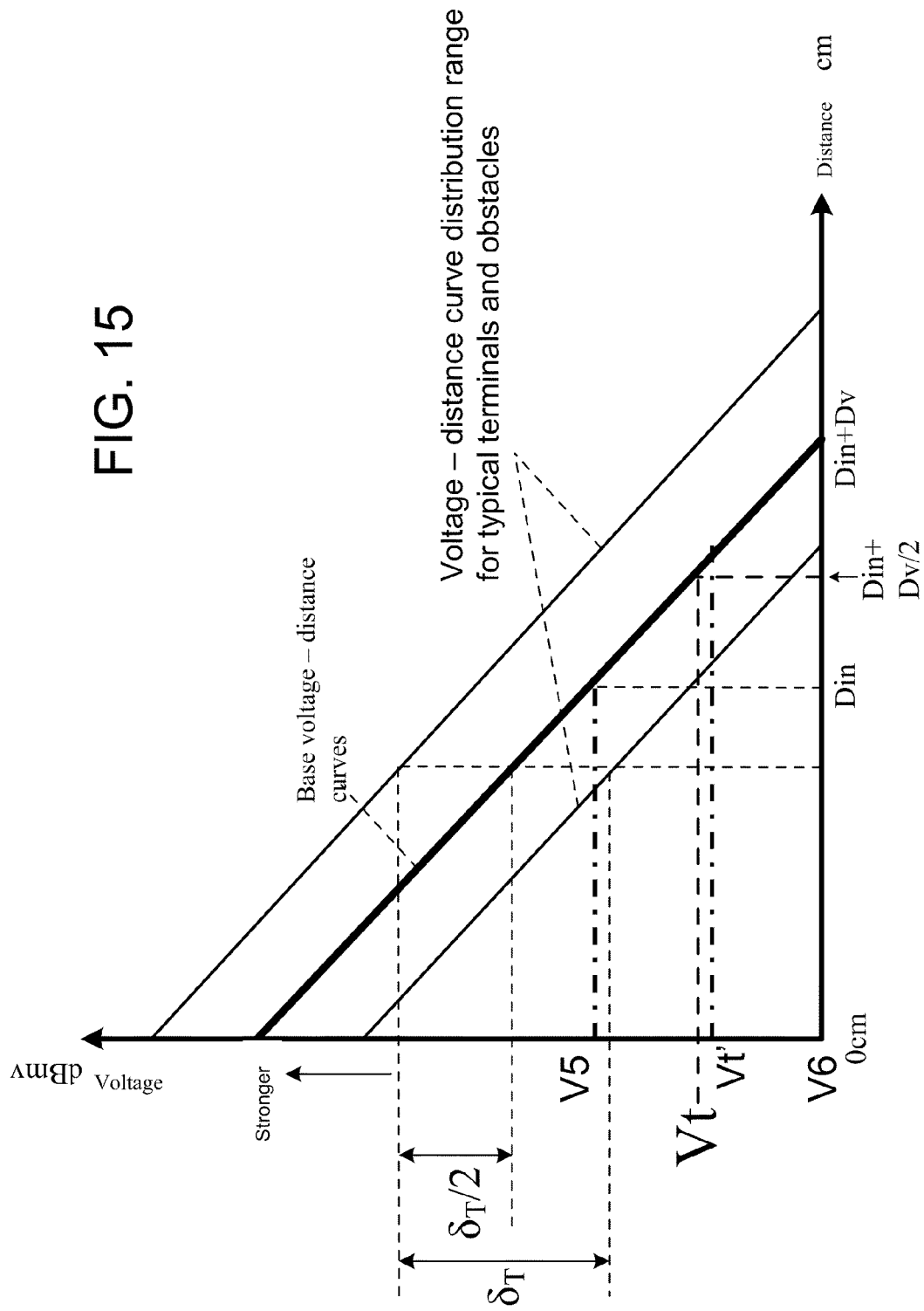
FIG. 15 illustrates the method of obtaining the base voltage-distance curve.

Step 202, obtaining a base voltage-distance curve, which is a median of the voltage-distance curves for various typical terminals and obstacles and has a distance to an upper limit and a lower limit of $\delta_T/2$, as illustrated in FIG. 15.

Step 203, selecting a voltage value corresponding to (Din+Dv/2) on the base voltage-distance curve as Vt, as illustrated in FIG. 15. Vt can be determined from other algorithms. In another example, also illustrated in FIG. 15, Din corresponds to a voltage V5 on the base voltage-distance curve, Din+Dv corresponds to a voltage V6 on the base voltage-distance curve, and the threshold voltage Vt' can be selected as (V5+V6)/2. If the base voltage-distance curve is not linear, Vt and Vt' may not be the same.

Step c, if the detected signal is larger than or equal to the predetermined threshold value, then the RF device is considered to have entered the predetermined effective transaction range, and the RF device obtains the identification information of the RF reader from the received magnetic signal, and sends the received identification information of the RF reader together with the identification information of the RF device to the RF reader through the RF channel.

Step d, the RF reader receives the information sent from the RF device through the RF channel, and compares with whether the identification information of the RF reader as received is consistent with the identification information of the RF reader as stored. If consistent, then forms a combination address using the identification information of the RF reader and the RF device, and performs a transaction with the RF device through the RF channel. The transaction can include, for example, electronic payment, value charging, consumption, and identification, etc.

The low frequency alternating magnetic field signal in accordance with the representative embodiments can have a frequency in an ultralow frequency range of 300 Hz-3 kHz, a very low frequency range of 3 kHz-30 kHz, or a low frequency range of 30 kHz-300 kHz.

For example, the low frequency alternating magnetic field signal has a frequency in a range of about 300 Hz-50 kHz. In some other examples, the low frequency alternating magnetic field signal has a frequency of about 500 Hz, 1 kHz, 1.5 kHz, 2 kHz, 2.5 kHz, 3 kHz, 4 kHz, 5 kHz, 10 kHz, 20 kHz, or 30 kHz.

The representative embodiments disclosed herein include both a low-frequency magnetic field one-way communication channel and an RF electromagnetic field high speed two-way communication channel. Advantageously, this avoids the problems of the antenna and the large variations in the attenuation of the signals due to the terminals in the conventional NFC systems, wherein a single-channel, 13.56 MHz two-way communication is adopted.

In one embodiment disclosed herein, the RF reader utilizes the low-frequency one-way channel to send its unique identification information (IDr) to the RF device, and the RF device utilizes the RF two-way channel to send its unique identification information (IDc) together with IDr back to the RF reader. The RF reader authenticates the returned IDr, and realizes the unique pairing between the RF reader and the RF device. The uniquely-paired apparatuses can exchange a large amount of data through the RF two-way communication channel, until the transaction is completed.

To realize the above short-range communication method, a short-range communication system is provided including a RF reader configured to transmit a low-frequency alternating magnetic field signal including identification information of the RF reader, and an RF device, wherein at least one of the RF reader or the RF device is configured to determine whether the RF device and the RF reader are in a predetermined effective communication range based on the low-frequency alternating magnetic field signal detected by the RF device. For example, the RF device can determine whether it is within the effective communication range with the RF reader based on the strength of the received magnetic field signal, measured as an electrical signal such as a voltage and compared with a predetermined threshold value Vt.

At least one of the RF reader or the RF device is further configured to authenticate the other of the RF reader or the RF device through at least one of the low-frequency alternating magnetic field signal or an RF channel. For example, the RF reader can authentic the pairing with the RF device by comparing the identification information of the RF reader stored therein and returned by the RF device. The authentication process passes, a combination address can be formed using the IDr and IDc, and the RF reader and the RF device perform the transaction therebetween through the RF channel.

In one exemplary embodiment, the communication system is realized using the following circuitry. The RF reader can include at least one low-frequency transmission coil, at least one drive circuit, at least one encoding circuit, at least one first main processor, at least one RF transceiver circuit, and at least one RF antenna. The low-frequency transmission coil, drive circuit, encoding circuit, first main processor, RF transceiver circuit, and RF antenna can be sequentially connected in series. In one embodiment, a modulation circuit can be disposed between the drive circuit and the encoding circuit.

The RF reader can be viewed as having a low-frequency transmission module including the low-frequency transmission coil, the drive circuit, the encoding circuit, and optionally the modulation circuit; and an RF transceiver including the first main processor, the RF transceiver circuit, and the RF antenna.

The RF device can include at least one low-frequency magnetic induction circuit, at least one low-frequency amplification circuit, at least one threshold judgment and demodulation circuit, at least one second main processor, at least one RF transceiver circuit, and at least one RF antenna. The low-frequency magnetic induction circuit, low-frequency amplification circuit, threshold judgment and demodulation circuit, second main processor, RF transceiver circuit, and RF antenna can be sequentially connected in series.

The RF device can be viewed as having a low-frequency receiving module including the low-frequency magnetic induction circuit, the low-frequency amplification circuit, and the threshold judgment and demodulation circuit; and an RF transceiver module including the second main processor, the RF transceiver circuit, and the RF antenna.

In one embodiment, the low-frequency transmission coil can be an enameled wire coil or a printed circuit board (PCB) coil. In one example, the low-frequency transmission coil has more than 10 turns. In another example, the low-frequency transmission coil has about 50-500 turns. The low-frequency transmission coil can have Ferrite cores or iron cores. The low-frequency transmission coil can have a cross-sectional area larger than a cross-sectional area of the magnetic induction coil in the RF device. For example, the cross-section can have a circular shape with a diameter of 3 cm, or a 3 cm×3 cm square shape.

The low-frequency magnetic induction circuit can include a printed circuit board (PCB) coil, an enameled wire coil, a Hall device, or a giant magnetoresistance (GMR) device.

The RF device is disposed in a mobile terminal, such as a cellular phone, a personal digital assistant (PDA), or a laptop computer. In some embodiments, the RF device can be, or disposed in, a SIM card, a UIM card, a USIM card, a TF card, or an SD card of a mobile terminal.

The principles of the exemplary short-range communication system can be described as follows:

A. The selection method and system for selecting f0 has been explained above.

B. The distance measurements and control can be realized as follows:

The RF reader, based on the range control target, using the predetermined transmission parameters, continuously transmit a low-frequency alternating magnetic field signal having a frequency f<f0. The signal carries data frames through modulation or direct base band transmission. The data frame can include a unique identification code IDr of the RF reader, or other types of identification information.

If a mobile terminal having the RF device disposed therein is placed adjacent the RF reader, the low-frequency alternating magnetic field signal penetrates the mobile terminal and reaches the RF device disposed therein. The RF device detects the magnetic field signal at various distances, and converts and amplifies the signal into a voltage signal having fixed amplitude. If the voltage amplitude is lower than the predetermined threshold value Vt of the RF device, the mobile terminal is considered outside the effective transaction range, and the transaction is not allowed. If the voltage amplitude is higher than Vt, the mobile terminal is considered inside the effective transaction range, and the low-frequency receiving module starts a decoding process, and obtains the IDr. On the other hand, the voltage signal in the RF device has a one-to-one correspondence with the distance between the RF reader and the RF device, and such a correspondence can be determined from the voltage-distance curve. Based on such a correspondence, the distance can be derived from the voltage signal, thereby indirectly obtaining the distance. The selection of Vt and transmission parameters can be a one-time process. After the selection, they do not need to be changed during the operation of the system.

C. The pairing process between the RF device and the RF reader:

The pairing can be a unique pairing. In one example, the RF device obtains IDr from the low-frequency signal, and sends the IDr to the second main processor of the RF device, and the second main processor sends the IDc together with the obtained IDr, through the RF transceiver, to the RF reader. The RF reader receives the IDr and IDc, and confirms that the RF device having an identification code IDc correctly returns the IDr, and thus is the unique communication terminal of this transaction. Due to that the encoding of IDr ensures that this RF reader and other identification codes of other adjacent RF readers are different, the RF device having the identification code IDc confirms that it has a unique communication with the RF reader having the identification code IDr. Thus, the RF device and the RF reader form a unique pairing or bonding, and can identify each other through a combination address (IDr, IDc). After the pairing, the communication between the two apparatuses is performed through the RF channel without misidentification. After the pairing, the range control is also completed, and the transaction is performed through the RF channel until it is completed.

D. Transaction process:

The RF reader and the RF device establish a unique communication chain through the RF channel. The two apparatuses thus realize the identification and other processes required for the transaction, and the processes can be completed through the RF channel quickly. Because the previous processes guarantee that the pairing can only be established within a predetermined effective communication range, the whole transaction can only be conducted within the predetermined effective communication range.

Figure 16:
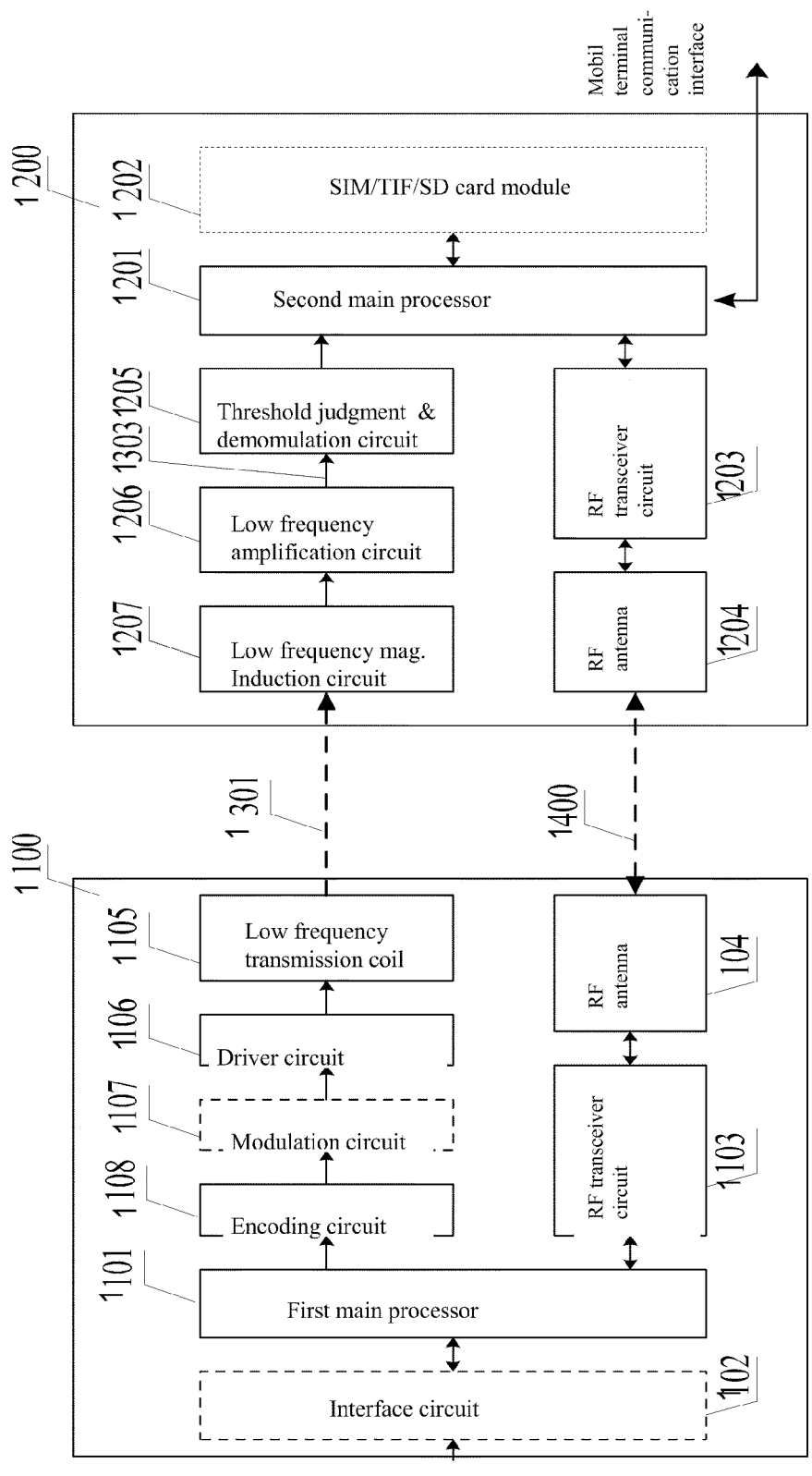
FIG. 16 illustrates a schematic diagram of a short-range communication system in a representative embodiment.

FIG. 16 illustrates a schematic diagram of a short-range communication system in a representative embodiment. The system includes a RF reader 1100 and an RF device 1200. The RF device 1200 is disposed inside a mobile terminal, and interacts with the mobile terminal through a communication interface of the mobile terminal.

The RF reader 1100 comprises a first main processor 1101 configured for low-frequency, high-frequency and other control processing. The first main processor 1101, through an interface circuit 1102 or directly, connects to an external communication port. The encoding circuit 1108 is configured to encode the low-frequency data frame bit by bit. The modulation circuit 1107 is configured to modulate the carrier wave using the encoded output symbols and send the modulated signals to the driver circuit 1106, or to send the encoded signals directly to the driver circuit 1106 if modulation is not needed. The driver circuit 1106 is configured to drive the low-frequency transmission coil 1105 to generate a low-frequency alternating magnetic field 1301. The low-frequency transmission coil 1105, the driver circuit 1106, the modulation circuit 1107, and the encoding circuit 1108 form the low-frequency transmission module, the transmitted field can have an adjustable or predetermined strength. The low-frequency transmission coil 1105 generally includes a coil having a specific shape and a relatively large number of turns. The RF transceiver circuit 1103 transmits and receives RF signals through the RF antenna 1104.

The RF device includes the second main processor 1201, which is configured for controlling low-frequency and RF modules and other processes, and is also configured for communication with the mobile terminal. The SIM/TF/SD card module 1202 is the SIM/TF/SD card for the mobile terminal, depending on the card type. The low-frequency magnetic induction circuit comprises a PCB coil, an enameled coil, or Hall device or other elements for sensing the magnetic field variation, and is configured to sense the low-frequency magnetic field signal 1301 and convert the signal 1301 into an electrical signal. The low-frequency amplification circuit 1206 is configured to amplify the electrical signal to obtain a low-frequency detection voltage signal 1303. The threshold judgment and demodulation circuit 1205 is configured to compare with voltage signal 1303 with the predetermined threshold value Vt. If the voltage signal does not reach Vt, no demodulation or transaction is allowed. If the voltage signal reaches Vt, the circuit 1205 demodulates the signal, and sends the demodulated signal to the second main processor 1201. The RF transceiver circuit 1203 is configured to perform the two-way communication with the RF receiver module of the RF reader through the RF antenna 1204.

The system uses the predetermined threshold value to realize distance examination and control without calibration. For example, the RF reader 1100 transmits the low-frequency alternating magnetic field signal 1301 according to predetermined transmission parameters. The RF device 1200 receives the magnetic signal and converts it into the voltage signal 1303, and determines whether the RF device is within the predetermined effective communication range based on Vt. The threshold value Vt is the same for different terminals, and there is no need to revise Vt for different terminals (or calibration). Through a combination of the low-frequency one-way communication and the RF two-way communication, the dual-channel communication uniquely pairs the RF reader 1100 and the RF device 1200. In one example, the RF device 1200 sends IDc appended to IDr to the RF reader 1100 through the RF channel, and the RF reader 1100 confirms whether the returned IDr is correct.

The process flow in a working example includes:

(I) Selecting the basic parameters of the system, including the RF frequency, f0, the RF reader transmission parameters, and Vt.

1. Selection of the RF frequency.

In some embodiments, the RF frequency is in the 2400-2483 MHz (2.4 G) ISM band, to realize the high speed communication and the capability of transmitting through various terminals. Other frequencies can also be adopted, such as 433 MHz, 900 MHz, 5 GHz, etc.

2. Selection of f0.

For typical GSM mobile communication terminals, to realize a range control of about 0-10 cm, typically f0<10 kHz. For example, f0=500 Hz, 1 kHz, 1.5 kHz, 2 kHz, 2.5 kHz, 3 kHz, 5 kHz, etc.

3. Selection of RF reader transmission parameters.

These transmission parameters include, for example, the modulation scheme, the encoding scheme, and Br.

FIG. 17 is a schematic diagram of a low-frequency transmission portion of the RF reader. Referring also to FIG. 16, the RF reader low-frequency transmission circuit comprises the driver circuit 1106, the modulation circuit 1107, and the encoding circuit 1108. The driver circuit 1106 drives the low-frequency modulation signal output to the low-frequency transmission coil 1105.

The modulation circuit 1107 can use a variety of modulation schemes:

1) Carrier wave modulation: the encoding circuit 1108 generates a base band signal and modulates the carrier wave through the modulation circuit 1107. The carrier wave can be a sine wave, a square wave, a triangle wave, etc. The modulation can use OOK, PSK, FSK, etc. The modulated signal is loaded to the low-frequency transmission coil 1105 through the driver circuit 1106.

2) No modulation direct base band transmission: the encoding circuit 1108 generates a base band signal, and directly loads it to the low-frequency transmission coil 1105 through the driver circuit 1106.

3) Other modulation schemes: in the embodiment where the threshold value Vt is a voltage amplitude, the modulation scheme does not use amplitude modulation, while other modulation schemes that can substantially maintain a fixed amplitude can be used with this embodiment.

The encoding circuit 1108 can adopt various encoding schemes:

a) Manchester encoding: bit 1 is encoded as two symbols, 01, and bit 0 is encoded as 10.

b) Differential Manchester encoding: two bit symbol sequences are used: 01 and 10. Bit 1 is encoded differently from the previous symbol sequence, bit 0 is encoded the same. A reverse of this can also be adopted for encoding.

c) Other encoding schemes: in the embodiment where the threshold value Vt is a voltage amplitude, the low-frequency modulation signal generally should maintain a substantially stable average value, and the encoded sequence should not have a DC component. Thus, those encoding schemes having an average DC component of 0 can be used in this embodiment.

After selecting the modulation scheme and the encoding scheme, using the methods described above, Br can be selected by, for example, adjusting the coil parameters such as the number of turns, the diameter, the shape, etc.

4. Selection of Vt.

The selection of Vt has been described above.

The above selection process for the parameters is a one-time process, and there is no need to change these parameters once they are selected.

(II) The work flow of the system after the selection of the parameters is described as follows:

Step A100: distance measurement and control. The first main processor 1101 of the RF reader 1100 generates data frames including the IDr, and sends it to the encoding circuit 1108 for encoding. The encoded signal is sent, through the modulation circuit 1107 or directly without modulation, to the driver circuit 1106. The signal is then sent to the transmission coil 1105 for transmission, through predetermined frame format, modulation scheme, encoding scheme, and driving capability. The transmission coil 1105 continuously sends out the low-frequency magnetic signal 1301 using the predetermined frame format. If the mobile terminal is disposed adjacent the RF reader, the magnetic field signal 1301 penetrates into the mobile terminal to reach the RF device 1200. The low-frequency magnetic induction circuit 1207 of the RF device 1200 detects the low-frequency signal, converts and amplifies it into an electrical signal 1303. If the amplitude of the electrical signal 1303≥Vt, the transaction is not allowed; otherwise RF device is considered to be within the effective transaction range, and the low-frequency receiving circuit starts the decoding process, and obtains IDr. On the other hand, the voltage signal and the distance have a one-to-one correspondence as determined from the voltage-distance curve. From the correspondence, the distance can be determined from the voltage signal.

The data frame format in Step A100 is defined as follows:

FIG. 18 illustrates the frame format of the low-frequency data of the RF reader. As shown, each frame is divided into the follow domains:

Synchronization domain: 8 bits, typically fast frequency hopping (FFH), used for frame synchronization;

Control domain: 8 bits, used for providing de-framing information of the data, such as the length, data type, etc., can be reserved for expansion;

IDr: N bit, the unique identification code of the RF reader, appointed by the control domain;

CRC: to check the control domain and IDr; can use cyclic redundancy check (CRC) or other methods.

The above frame format is only an example of frame formats that can be used by the embodiments disclosed herein. In general any frame formats that can uniquely identify the RF reader can be used. The unique identification code can be a random number with a sufficient length, or a manually assigned code, or any other identification codes.

Step A200, the RF reader 1100 uniquely pairs with the RF device 1200. This also uniquely pairs the RF reader and the mobile terminal having the RF device 1200 installed therein. The RF device obtains IDr and sends it to the first main processor 1201 of the RF device, which sends IDc together with IDr to the RF reader 1100 through the RF transceiver circuit 1203 and the RF antenna 1204. The RF reader 1100 authenticates that the correct IDr is returned, from the RF device 1200 that has the unique IDc, and accepts the RF device 1200 as the single communication terminal during this transaction. Due to that the encoding of IDr ensures that this RF reader and other identification codes of other adjacent RF readers are different, the RF device having the identification code IDc confirms that it has a unique communication with the RF reader having the identification code IDr. Thus, the RF device and the RF reader form a unique pairing or bonding, and can identify each other through a combination address (IDr, IDc). After the pairing, the communication between the two apparatuses is performed through the RF channel without misidentification. After the pairing, the range control is also completed, and the transaction is performed through the RF channel until it is completed.

In Step A200, the unique identification code IDc of the RF device can be a code pre-stored in, for example, non-volatile memory (NVM) of the RF device, or a sufficiently long random number generated by the RF device.

Step A300: transaction process. The RF reader 1100 and the RF device 1200 establish a unique communication chain through the RF channel. The two apparatuses thus realize the identification and other processes required for the transaction, and the processes can be completed through the RF channel quickly until the transaction is completed. Because the previous steps A100-A200 guarantee that the pairing can only be established within a predetermined effective communication range, the whole transaction can only be conducted within the predetermined effective communication range. The transaction process is generally known POS process flow and is not described here in detail.

The low-frequency magnetic induction circuit 1207 of the RF device 1200 can comprise a PCB coil, an enameled coil, or a Hall device or other elements for sensing the magnetic field variation, and is configured to sense the low-frequency magnetic field signal 1301 and convert the signal 1301 into an electrical signal. In a preferred embodiment, the circuit 1207 fits inside an IC card such as a SIM card for a cellular phone such that by replacing the conventional SIM card with an RF SIM card, the cellular phone is added with the RF and the magnetic short-range communication capabilities.

At least some of the embodiments disclosed herein have at least the advantages including, for example, adding secure two-way short-range communication capabilities to mobile terminals without modifying the mobile terminal. Rather, a SIM card, TF card, SD card, or other plug-and-play cards can be replaced with a card in accordance with embodiments disclosed herein. In one embodiment, the RF reader transmits the low-frequency alternating magnetic field signal, and the RF device only need to receive this magnetic field signal, thus forming a one-way communication. In addition, the RF device does not need the energy through the magnetic field from the RF reader. Thus, the magnetic induction coil and other receiving circuits in the RF device can be miniaturized. For example, the RF device can be integrated into a SIM card, a TF card, an SD card, or the like. Due to the relatively weak received signal, the RF device may need to have an amplification circuit added therein. The RF device also has RF transceiver circuits, which form the two-way high speed communication with the RF transceiver circuits of the RF reader. As previously described, the RF antenna can be very small, making it easier to be integrated onto a SIM card, a TF card, an SD card, or the like.

Below the selected frequency f0, as described above, the system does not require calibration. For a system with a working frequency above f0, it is also acceptable, although the range control may be more complex, and some calibrations may be needed. This does not conflict in principle with the embodiments described above.

The systems and methods disclosed herein reduce the effects of structural differences of various mobile terminals on the range control variations. FIG. 19 illustrates voltage-distance curves measured for various terminals that receive a 1 kHz magnetic field. The signal strength is that after necessary amplification, with a fixed amplification. As shown, the differences caused by different terminals <5 dB, while the variations in the signals of these terminals due to the distance change of 1-10 cm reach 40 dB. Thus, using a predetermined Vt, the range control has an error due to the differences in the different terminals of about 1 cm, which is sufficient for the range control without calibration.

Although the foregoing refers to particular preferred embodiments, it will be understood that the disclosure is not so limited. It will occur to those of ordinary skill in the art that various modifications may be made to the disclosed embodiments and that such modifications are intended to be within the scope of the disclosure. All of the publications, patent applications and patents cited herein are incorporated herein by reference in their entirety.

What is claimed is:

1. A radio frequency (RF) device comprising:
   an RF transceiver;
   an RF antenna; and
   a magnetic signal detector;
   wherein the magnetic signal detector is configured to:
      receive a magnetic field signal from an RF reader, the magnetic field signal including identification information of the RF reader, and
      determine, based on the magnetic field signal, whether the RF device and the RF reader are in an effective communication,
   wherein the RF transceiver is configured to:
      send authentication information to the RF reader, and conduct a transaction with the RF reader through an RF channel, and
   wherein the magnetic field signal comprises a low-frequency alternating magnetic field that has a frequency selected such that at or below the frequency no calibration is required for different mobile terminals having the RF device installed therein.

2. The RF device of claim 1, wherein said magnetic signal detector is configured to control a communication range between the RF device and an RF reader.

3. The RF device of claim 1, wherein said RF device comprises a subscriber identity module (SIM) card comprising a SIM portion, and wherein the RF transceiver is configured to be in a dormant state if the magnetic signal detector does not receive a magnetic field signal, and to be activated by an electrical signal converted from a magnetic field signal received by the magnetic signal detector.

4. The RF device of claim 1, further comprising a microcontroller,
   wherein the RF transceiver is electrically connected to the RF antenna and the first microcontroller; and
   wherein the magnetic signal detector is electrically connected to the RF transceiver.

5. The RF device of claim 1, wherein the magnetic detector comprises one of an induction coil, a Hall device, or a magnetic induction switch.

6. The RF device of claim 1, wherein the RF transceiver has an activation threshold for activation by an electrical signal converted from a magnetic field signal.

7. The RF device of claim 6, wherein the activation threshold is adjustable based on a predetermined communication range between the RF SIM card and an RF card reader.

8. The RF device of claim 1, wherein the RF device has a communication range determined by an activation threshold of the RF transceiver.

9. The RF device of claim 1, wherein the RF transceiver is configured to function in a super high frequency (SHF), a very high frequency (VHF), or an ultra high frequency (UHF) range.

10. The RF device of claim 1, wherein the RF device is a replaceable RF SIM card of a mobile communication terminal.

11. The RF device of claim 10, wherein the RF SIM card has a communication range that does not depend substantially on the mobile communication terminal in which the RF SIM card is disposed.

12. The RF device of claim 1, wherein the magnetic field signal is a matching signal suitable for the RF SIM card.

13. The RF device of claim 1, further comprising a first microcontroller, wherein the first microcontroller is configured to be in a dormant state if the magnetic signal detector does not receive a magnetic field signal, and wherein the RF transceiver is further configured to examine whether an RF signal exists to determine whether to interrupt or wake up the first microcontroller and to enter a working state, wherein in the working state the RF transceiver exchanges data with an RF card reader.

14. The RF device of claim 1, wherein said authentication information comprises:
   the identification information of the RF reader received by the RF device; and
   identification information of the RF device.

15. The RF device of claim 1, wherein the RF device is configured to determine whether the RF device and the RF reader are in a predetermined effective communication range based on the magnetic field signal detected by the RF device.

16. The RF device of claim 15, wherein the RF device is configured to determine whether the RF device and the reader device are in the predetermined effective communication range by comparing an electrical signal converted from the detected magnetic field signal with a threshold.

17. The RF device of claim 16, wherein said threshold is determined using a signal value-distance relation measured from a terminal having the RF device disposed therein.

18. The RF device of claim 16, wherein said electrical signal comprises one of a voltage signal or a current signal.

19. The RF device of claim 1, wherein said low-frequency alternating magnetic field signal has a frequency in an ultralow frequency range of 300 Hz-3 kHz, a very low frequency range of 3 kHz-30 kHz, or a low frequency range of 30 kHz-300 kHz.

20. A communication system, comprising:
    an RF device; and
    an RF reader,
        wherein the RF device and the RF reader are configured to have a communication range controlled through a magnetic signal and to exchange information through an RF channel,
        wherein the RF reader is configured to transmit a low-frequency alternating magnetic field signal including identification information of the RF reader,
        wherein at least one of the RF reader and the RF device is configured:
            (A) to determine whether the RF device and the RF reader are in a predetermined effective communication range, based on the low-frequency alternating magnetic field signal detected by the RF device, and
            (B) to authenticate the other of the RF reader or the RF device through at least one of the low-frequency alternating magnetic field signal or an RF channel, and
        wherein both the RF reader and the RF device are configured to perform a transaction therebetween through the RF channel.

21. The communication system of claim 20,
    wherein the RF device is an RF subscriber identity module (SIM) card comprising:
        a SIM portion;
        a first transceiver;
        a first RF antenna; and
        a magnetic signal detector;
        wherein the first transceiver is configured to be in a dormant state if the magnetic induction module does not receive a magnetic field signal, and to be activated by an electrical signal converted from a magnetic field signal received by the magnetic signal detector; and
    wherein the RF reader comprises:
        a second transceiver;
        a second RF antenna; and
        a magnetic field transmitter;
        wherein the magnetic field transmitter is configured to generate the magnetic field signal to active the first transceiver module if the RF SIM card and the RF reader are within an effective communication range.

22. The communication system of claim 21, wherein the second transceiver is configured to function in the super high frequency (SHF), very high frequency (VHF), or ultra high frequency (UHF) range.

23. The communication system of claim 21, wherein the first transceiver has an adjustable activation threshold for activation by the electrical signal converted from the magnetic field signal, and wherein the activation threshold is adjusted based a predetermined communication range between the RF SIM card and the RF reader.

24. The communication system of claim 21, wherein a communication range between the RF SIM card and the RF reader is determined based on an activation threshold of the first transceiver.

25. The communication system of claim 20, wherein the RF device and the RF reader device are further configured for identification through the magnetic signal.

26. The communication system of claim 25, wherein RF device and the RF reader device are further configured for identification through both the magnetic signal and the RF channel.

27. The communication system of claim 20, wherein the RF device is configured to determine whether the RF device and the RF reader are in the predetermined effective communication range by comparing an electrical signal converted from the detected low-frequency alternating magnetic field signal with a threshold.

28. The communication system of claim 27, wherein said electrical signal comprises one of a voltage signal or a current signal.

29. The communication system of claim 20, wherein the RF device is further configured to obtain the identification information of the RF reader from the low-frequency alternating magnetic field signal.

30. The communication system of claim 29, wherein the RF device is further configured to send the obtained identification information of the RF reader and identification information of the RF device to the RF reader through the RF channel.

31. The communication system of claim 20, wherein said RF reader comprises:
    at least one low-frequency transmission coil;
    at least one drive circuit;
    at least one encoding circuit;
    at least one first main processor;
    at least one RF transceiver circuit; and
    at least one RF antenna.

32. The communication system of claim 31, wherein said low-frequency transmission coil, drive circuit, encoding circuit, first main processor, RF transceiver circuit, and RF antenna are connected in series.

33. The communication system of claim 31, further comprising a modulation circuit disposed between the drive circuit and the encoding circuit.

34. The communication system of claim 31, wherein said low-frequency transmission coil is an enameled wire coil or a printed circuit board (PCB) coil.

35. The communication system of claim 31, wherein said low-frequency transmission coil has more than 10 turns.

36. The communication system of claim 31, wherein said low-frequency transmission coil has about 50-500 turns.

37. The communication system of claim 31, wherein said low-frequency transmission coil has a Ferrite core or an iron core.

38. The communication system of claim 31, wherein said RF device comprises:
    at least one low-frequency magnetic induction circuit;
    at least one low-frequency amplification circuit;
    at least one threshold judgment and demodulation circuit;
    at least one second main processor;
    at least one RF transceiver circuit; and
    at least one RF antenna.

39. The communication system of claim 38, wherein said low-frequency magnetic induction circuit, low-frequency amplification circuit, threshold judgment and demodulation circuit, second main processor, RF transceiver circuit, and RF antenna are connected in series.

40. The communication system of claim 38, wherein said low-frequency magnetic induction circuit comprises a printed circuit board (PCB) coil, an enameled wire coil, a Hall device, or a giant magnetoresistance (GMR) device.

41. The communication system of claim 20, wherein said RF device is disposed in a terminal.

42. The communication system of claim 41, wherein said terminal is a mobile terminal comprising one of a cellular phone, a personal digital assistant (PDA), or a laptop computer.

43. The communication system of claim 20, wherein said RF device is, or is disposed in, a SIM card, a UIM card, a USIM card, a TF card, or an SD card.

44. A communication method of an RF device communicating with an RF reader and controlling a communication range between the RF device and the RF reader using a magnetic field generated by a magnetic signal transmitter of the RF reader, the RF device comprising a magnetic signal detector configured to detect a magnetic field signal transmitted from the magnetic signal transmitter, the method comprising:
  receiving, by the magnetic signal detector, the magnetic field signal modulated by the magnetic signal transmitter based on predetermined instruction information;
  decoding, by the magnetic signal detector, the instruction information after receiving the magnetic field signal;
  sending, by the RF device, based on the decoded instruction information, the corresponding RF information to the RF reader through an RF channel; and
  exchanging, by the RF device with the RF reader, information through a radio frequency (RF) communication if an identification performed by the RF reader based on the RF information passes.

45. The communication method of claim 44, wherein the RF device includes an RF SIM card, the method further comprising:
  if the RF SIM card and the RF reader are not within an effective communication range, having a first transceiver of the RF SIM card in a dormant state; and
  if the RF SIM card and the RF card reader are within the effective communication range, converting a magnetic field signal into an electrical signal to activate the first transceiver module, wherein the magnetic signal is generated by a magnetic field generation module of the RF card reader and received by a magnetic induction module of the RF SIM card.

46. The method of claim 45, further comprising:
  determining whether to interrupt or wake up a first microcontroller in the RF SIM card based on whether an RF signal is detected; and
  if the RF signal is detected, waking up the first microcontroller, activating the first transceiver module to enter a working state to thereby exchange data with a second transceiver module in the RF card reader, and sending the exchanged data to respective microcontrollers of the RF SIM card and the RF card reader for processing.

47. The method of claim 45, further comprising adjusting an activation threshold of the first transceiver module to thereby select an effective communication range between the RF SIM card and the RF card reader.

48. The method of claim 45, further comprising disposing the RF SIM card in a mobile communication terminal, wherein the effective communication range between the RF SIM card and the RF card reader does not depend substantially on the mobile communication terminal.

49. The method of claim 45, wherein the first and second transceiver modules are configured to function in the super high frequency (SHF), very high frequency (VHF), or ultra high frequency (UHF) range.

50. The communication method of claim 44, further comprising authenticating at least one of the RF device and the RF reader through the magnetic field.

51. The communication method of claim 44, further comprising authenticating at least one of the RF device and the RF reader through both the magnetic field and the RF communication.

52. The communication method of claim 44, wherein said magnetic field is a non-alternating magnetic field.

53. The communication method of claim 44, wherein said magnetic field is a low-frequency alternating magnetic field.

54. The communication method of claim 53, wherein said low-frequency alternating magnetic field has a frequency of about 0.1 kHz-100 kHz.

55. The communication method of claim 53, wherein said low-frequency alternating magnetic field has a frequency of about 1 kHz-30 kHz.

56. The communication method of claim 53, wherein said low-frequency alternating magnetic field has a frequency of about 1 kHz, 2 kHz, 5 kHz, 10 kHz, 20 kHz, 30 kHz, or 50 kHz.

57. The communication method of claim 44, wherein said magnetic signal transmitter transmits an amplitude-variable magnetic field based on the preset instruction information.

58. The communication method of claim 44, wherein said magnetic field has a distribution that has little or no variation.

59. The communication method of claim 44, wherein said modulating comprises an on-off keying (OOK) or a time modulation scheme.

60. The communication method of claim 44, wherein said RF device is configured to send the decoded instruction information directly to said RF reader through the RF channel, and wherein said identification passes only if the instruction information received by the RF reader match the preset instruction information.

61. The communication method of claim 44, wherein said magnetic signal transmitter has a predetermined effective transmission range.

62. The communication method of claim 44, wherein said magnetic signal detector has a predetermined effective detection range.

63. The communication method of claim 44, wherein if said magnetic signal detector does not detect a magnetic field signal, other portions of said RF device are in a dormant state; if said magnetic signal detector detects a magnetic field, said magnetic signal detector converts the detected magnetic field into an electrical signal, and activates the other portions of the RF device.

64. The communication method of claim 63, wherein said magnetic module has a predetermined threshold value for comparing with said converted electrical signal to determine whether to activate the other modules of the RF device.

65. The communication method of claim 64, wherein said threshold value is adjustable.

66. The communication method of claim 44,
  wherein said controlling a communication range comprises determining whether the RF device is in a predetermined effective communication range of the RF reader on a low-frequency alternating magnetic field signal transmitted by the RF reader and detected by the RF device, wherein the low-frequency alternating magnetic field signal includes identification information of the RF reader, the method further comprising authenticating at least one of the RF device and the RF reader.

67. The communication method of claim 66, wherein said determining comprises:
converting the low-frequency alternating magnetic field signal into an electrical signal; and
comparing the electrical signal with a predetermined threshold value,
wherein the predetermined threshold value is substantially the same for different mobile terminals having the RF device disposed therein.

68. The communication method of claim 66, wherein said authenticating comprises:
sending identification information of the RF device and the identification information of the RF reader received by the RF device from the RF device to the RF reader; and
comparing the identification information of the RF reader received by the RF reader with identification information stored at the RF reader,
wherein said performing a transaction is conducted only if said comparing yields a matching result.

69. The communication method of claim 68, further comprising forming a combination address using the identification information of the RF reader and the identification information of the RF apparatus, wherein the transaction is performed using the combination address.

70. The communication method of claim 66, wherein the low-frequency alternating magnetic field has a frequency selected such that at or below the frequency no calibration is required for different mobile terminals having the RF device installed therein.

71. The communication method of claim 70, wherein the frequency is below a system highest working frequency f0, below which no calibration is required for different mobile terminals having the RF device installed therein, and wherein f0 is determined by:
determining a system range control target (Din, Dv), wherein Din represents an effective communication range between a terminal having the RF device disposed therein and the RF reader, Dv represents a range of distance variation, wherein within a distance between 0 and Din the transaction is guaranteed, wherein within a distance between Din and Din+Dv the transaction can still be performed, wherein beyond a distance of Din+Dv the transaction is not allowed;
determining a detection signal variation range $\delta_R$ at the RF device caused by the RF reader;
determining a detection signal variation range $\delta_C$ at the RF device caused by the RF device itself;
measuring signal-distance curves for various typical types of terminals and obstacles under a testing frequency f;
determining a detection signal variation range $\delta_A$ at the RF device based on the system range control target (Din, Dv), wherein $\delta_A$ equals a signal difference between a first signal value and a second signal value, wherein the first signal value corresponds to Din on an average signal value-distance curve, wherein the average signal value-distance curve has an average field attenuation curve slope obtained from the signal value-distance curves for various typical types of terminals and obstacles, wherein the second signal value corresponds to (Din+Dv) on the average signal value-distance curve;
determining a detection signal variation range $\delta_T$ at the RF device resulting from attenuation characteristics of the terminal, wherein $\delta_T = \delta_A - \delta_R - \delta_C$; and
calculating a largest field strength variation $\delta$ at a plurality of locations for various typical terminals and obstacles and, if $\delta > \delta_T$, then reducing the testing frequency f, and repeating the measuring step; if $\delta = \delta_T$, then the present testing frequency f equals f0.

72. The communication method of claim 70, wherein the low-frequency alternating magnetic field is transmitted according to predetermined transmission parameters including the frequency, a modulation scheme, an encoding scheme, and a transmission magnetic field strength amplitude Br.

73. The communication method of claim 72, wherein said modulation scheme, encoding scheme, and Br are selected such that Vr/Vn>SNR, wherein:
Vr is a detected signal at the RF device under a condition that the RF reader transmits the low-frequency alternating magnetic field signal with the selected modulation scheme and encoding scheme;
Vn is a noise level at the RF device under a condition that the RF reader does not transmit the low-frequency alternating magnetic field signal; and
SNR is a predetermined signal-to-noise ratio of the RF device.

74. The communication method of claim 73, wherein the encoding scheme does not introduce an average DC component.

75. The communication method of claim 74, wherein the modulation scheme does not introduce an amplitude variation or a carrier modulation scheme variation.

76. The communication method of claim 72, wherein said encoding scheme comprises one of a Manchester encoding, a differential Manchester encoding, and a return-to-zero encoding, and wherein said modulation scheme comprises one of an on-off keying (OOK), a phase-shift keying (PSK), and a frequency-shift keying (FSK).

77. The communication method of claim 71, further comprising determining a signal threshold value Vt for determining whether the RF device and the RF reader are in the predetermined effective communication range, wherein Vt is determined by:
measuring signal-distance curves for various typical terminals and obstacles;
obtaining a base signal-distance curve, which is a median of the signal-distance curves for the various typical terminals and obstacles and has a distance of $\delta_T/2$ to an upper limit and a lower limit of the signal-distance curves for the various typical terminals and obstacles; and
selecting a signal value corresponding to (Din+Dv/2) on the base signal-distance curve as Vt.

78. The communication method of claim 71, further comprising determining a signal threshold value Vt for determining whether the RF device and the RF reader are in the predetermined effective communication range, wherein Vt is determined by:
measuring signal-distance curves for various typical terminals and obstacles;
obtaining a base signal-distance curve, which is a median or average of the signal-distance curves for the various typical terminals and obstacles; and
selecting a signal value corresponding to (V5+V6)/2 on the base signal-distance curve as Vt,
wherein V5 is a voltage on the base signal-distance curve corresponding to Vin, and V6 is a voltage on the base signal-distance curve corresponding to Din+Dv.

79. The communication method of claim 44, wherein said low-frequency alternating magnetic field signal has a frequency in an ultralow frequency range of 300 Hz-3 kHz, a very low frequency range of 3 kHz-30 kHz, or a low frequency range of 30 kHz-300 kHz.

80. The communication method of claim 78, wherein said low-frequency alternating magnetic field signal has a frequency in a range of about 300 Hz-50 kHz.

81. The communication method of claim 79, wherein said low-frequency alternating magnetic field signal has a frequency of about 500 Hz, 1 kHz, 1.5 kHz, 2 kHz, 2.5 kHz, 3 kHz, 4 kHz, 5 kHz, 10 kHz, 20 kHz, or 30 kHz.

\* \* \* \* \*